United States Patent
Pechanek et al.

(10) Patent No.: US 7,272,700 B1
(45) Date of Patent: Sep. 18, 2007

(54) METHODS AND APPARATUS FOR INDIRECT COMPOUND VLIW EXECUTION USING OPERAND ADDRESS MAPPING TECHNIQUES

(75) Inventors: Gerald George Pechanek, Cary, NC (US); Edwin Franklin Barry, Vilas, NC (US)

(73) Assignee: Altera Corporation, San Jose, CA (US)

( * ) Notice: Subject to any disclaimer, the term of this patent is extended or adjusted under 35 U.S.C. 154(b) by 345 days.

(21) Appl. No.: 10/745,267

(22) Filed: Dec. 23, 2003

(51) Int. Cl.
G06F 9/30 (2006.01)
G06F 9/40 (2006.01)
G06F 15/00 (2006.01)

(52) U.S. Cl. ..................... 712/209; 712/226
(58) Field of Classification Search ............... 712/226, 712/24
See application file for complete search history.

(56) References Cited

U.S. PATENT DOCUMENTS 5,925,124 A * 7/1999 Hilgendorf et al. ......... 712/227
6,260,136 B1 * 7/2001 Kabuo ........................ 712/217
6,457,118 B1 * 9/2002 Peng et al. ................. 712/226
6,766,439 B2 * 7/2004 Paolucci ..................... 712/208
2002/0078320 A1 * 6/2002 Barry et al. .................. 712/24
2002/0087846 A1 * 7/2002 Nickolls et al. ............ 712/229

* cited by examiner

Primary Examiner—Richard L. Ellis
Assistant Examiner—Brian P Johnson
(74) Attorney, Agent, or Firm—Priest & Goldstein, PLLC

(57) ABSTRACT

An VLIW instruction mechanism is described which accesses multiple slot instructions for execution to achieve high levels of selectable parallelism and to make improvements to code density. To this end, the VLIW instruction mechanism includes a short instruction word (SIW) register for holding an SIW. The SIW includes an indication of a slot instruction to execute and a dynamic slot instruction operand which is used by the slot instruction to execute. Further, the VLIW instruction mechanism includes a register for holding slot instructions which are retrieved from VLIW memory. The retrieved slot instructions include a stored operand which is used when executing the retrieved slot instruction. The VLIW instruction mechanism further includes a controller and an execution unit. The controller selects which of the operands are utilized with the retrieved slot instructions. The execution unit executes the retrieved slot instruction with the selected operand.

23 Claims, 17 Drawing Sheets

FIG. 6A

| CS1 | SELECTION OF TWO ARITHMETIC UNITS |
|---|---|
| 00 | MAU PLUS ALU |
| 01 | MAU PLUS DSU |
| 10 | ALU PLUS DSU |
| 11 | RESERVED |

FIG. 6B

| CS2 | SELECTION OF LOAD UNIT PLUS ARITHMETIC OR STORE UNIT |
|---|---|
| 00 | LOAD PLUS MAU |
| 01 | LOAD PLUS ALU |
| 10 | LOAD PLUS DSU |
| 11 | LOAD PLUS STORE |

FIG. 6C

| CS3 | SELECTION OF STORE UNIT PLUS ARITHMETIC UNIT |
|---|---|
| 00 | STORE PLUS MAU |
| 01 | STORE PLUS ALU |
| 10 | STORE PLUS DSU |
| 11 | RESERVED |

FIG. 7

| GROUP | Opcode | BITS 24-22 | INSTRUCTION |
|---|---|---|---|
| 01 | 0000 | xxx | EPLOOPx, EPLOOPIx |
| 01 | 0001 | xxx | RESERVED |
| 01 | 0010 | xxx | CALL |
| 01 | 0011 | xxx | JMP |
| 01 | 0100 | xxx | LV/SETV |
| 01 | 0101 | xxx | XV /—720 |
| 01 | 0110 | xxx | RESERVED |
| 01 | 0111 | xxx | DOUBLE ARITHMETIC XV-1-DXV1 /—710 |
| 01 | 1000 | xxx | DOUBLE ARITHMETIC XV-2-DXV2 /—712 |
| 01 | 1001 | xxx | DOUBLE ARITHMETIC XV-3-DXV3 /—714 |
| 01 | 1010 | xxx | LOAD UNIT PLUS ARITHMETIC OR STORE UNIT XV-LAXV OR LSXV /—716 |
| 01 | 1011 | xxx | STORE UNIT PLUS ARITHMETIC UNIT XV-SAXV /—718 |
| 01 | 1100 | xxx | RESERVED |
| 01 | 1101 | xxx | RESERVED |
| 01 | 1110 | xxx | RESERVED |
| 01 | 1111 | 000 | RET |
| 01 | 1111 | 001 | RETI |
| 01 | 1111 | 010 | SYSCALL |
| 01 | 1111 | 011 | RESERVED |
| 01 | 1111 | 100 | RESERVED |
| 01 | 1111 | 101 | RESERVED |
| 01 | 1111 | 110 | NOP |
| 01 | 1111 | 111 | RESERVED |

FIG. 8A

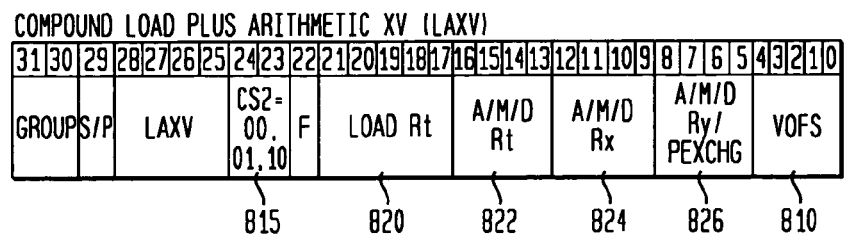

COMPOUND LOAD PLUS ARITHMETIC XV (LAXV)

| 31 30 | 29 | 28 27 26 25 | 24 23 22 | 21 | 20 19 18 17 | 16 15 14 13 | 12 11 10 9 | 8 7 6 5 | 4 3 2 1 0 |
|---|---|---|---|---|---|---|---|---|---|
| GROUP | S/P | LAXV | CS2= 00, 01, 10 | F | LOAD Rt | A/M/D Rt | A/M/D Rx | A/M/D Ry/ PEXCHG | VOFS |

| INSTRUCTION | OPERANDS | OPERATION |
|---|---|---|
| LAXV.[SP] | VOFS, CS2=[AMD], F=[01], LoadRt, A/M/D_Rt, A/M/D_Rx, A/M/D_Ry | EXECUTE (V[0]+VOFS)[LU]<br>EXECUTE (V[0]+VOFS)[ALU] IF (CS2=A)<br>EXECUTE (V[0]+VOFS)[MAU] IF (CS2=M)<br>EXECUTE (V[0]+VOFS)[DSU] IF (CS2=D)　855<br><br>LAXV SUPPLIED OPERAND ADDRESSES REPLACE LEAST SIGNIFICANT BITS OF VIM ACCESSED SELECTED INSTRUCTIONS DEPENDENT UPON DATA TYPE AND OPCODES OF THE VIM INSTRUCTIONS.<br><br>ARITHMETIC FLAGS ← ALU IF (F=1 & CS2=A)<br>ARITHMETIC FLAGS ← MAU IF (F=1 & CS2=M)　860<br>ARITHMETIC FLAGS ← DSU IF (F=1 & CS2=D)<br>ARITHMETIC FLAGS ← NONE IF (F=0)　862 |

| INSTRUCTION | OPERANDS | OPERATION |
|---|---|---|
| LSXV.[SP] | VOFS, CS2=[11], LoadRt, StoreRt. | EXECUTE (V[0]+VOFS)[LU] } 955<br>EXECUTE (V[0]+VOFS)[SU]<br><br>LSXV SUPPLIED OPERAND ADDRESSES REPLACE LEAST SIGNIFICANT BITS OF VIM ACCESSED SELECTED INSTRUCTIONS DEPENDENT UPON DATA TYPE AND OPCODES OF THE VIM INSTRUCTIONS. |

FIG. 10A

COMPOUND STORE PLUS ARITHMETIC XV (SAXV) — 1000

| 31 30 | 29 | 28 27 26 25 | 24 23 | 22 | 21 20 19 18 17 | 16 15 14 13 | 12 11 10 9 | 8 7 6 5 | 4 3 2 1 0 |
|---|---|---|---|---|---|---|---|---|---|
| GROUP | S/P | SAXV | CS3= 00, 01, 10 | F | Store Rt | A/M/D Rt | A/M/D Rx | A/M/D Ry | VOFS |

Labels: 1015 (CS3), 1020 (Store Rt), 1022 (Rt), 1024 (Rx), 1026 (Ry), 1010 (VOFS)

| INSTRUCTION | OPERANDS | OPERATION |
|---|---|---|
| SAXV.[SP] | VOFS, CS3=[AMD], F=[01], StoreRt, A/M/D_Rt, A/M/D/_Rx, A/M/D_Ry | EXECUTE (V[0]+VOFS)[SU]<br>EXECUTE (V[0]+VOFS)[ALU] IF (CS3=A)<br>EXECUTE (V[0]+VOFS)[MAU] IF (CS3=M)    } 1055<br>EXECUTE (V[0]+VOFS)[DSU] IF (CS3=D)<br><br>SAXV SUPPLIED OPERAND ADDRESSES REPLACE LEAST SIGNIFICANT BITS OF VIM ACCESSED SELECTED INSTRUCTIONS DEPENDENT UPON DATA TYPE AND OPCODES OF THE VIM INSTRUCTIONS.<br><br>ARITHMETIC FLAGS ← ALU IF (F=1 & CS3=A)<br>ARITHMETIC FLAGS ← MAU IF (F=1 & CS3=M)   } 1060<br>ARITHMETIC FLAGS ← DSU IF (F=1 & CS3=D)<br>ARITHMETIC FLAGS ← NONE IF (F=0) — 1062 |

COMPOUND DOUBLE ARITHMETIC XV (DXV1/2/3)

| 31 30 29 | 28 | 27 26 25 | 24 23 | 22 21 20 19 | 18 17 16 15 | 14 13 12 11 | 10 9 8 | 7 6 5 | 4 3 2 1 0 |
|---|---|---|---|---|---|---|---|---|---|
| GROUP | S/P | DXV1. DXV2. DXV3. | CS1 | M/A Rt | M/A Rx | M/A Ry | A/D Rt | A/D Rx | A/D Ry | VOFS |

| INSTRUCTION | OPERANDS | OPERATION |
|---|---|---|
| DXV1.[SP], DXV2.[SP], DXV3.[SP] | VOFS, CS1=[MA, MD, AD], M/A_Rt, M/A_Rx, M/A_Ry, A/D_Rt, A/D_Rx, A/D_Ry | EXECUTE (V[0]+VOFS)[MAU] IF (CS1=MA)<br>EXECUTE (V[0]+VOFS)[ALU] IF (CS1=MA)<br>EXECUTE (V[0]+VOFS)[MAU] IF (CS1=MD)<br>EXECUTE (V[0]+VOFS)[DSU] IF (CS1=MD)<br>EXECUTE (V[0]+VOFS)[ALU] IF (CS1=AD)<br>EXECUTE (V[0]+VOFS)[DSU] IF (CS1=AD)  } 1155<br><br>DXV1/2/3 SUPPLIED OPERAND ADDRESSES REPLACE LEAST SIGNIFICANT BITS OF VIM ACCESSED SELECTED INSTRUCTIONS DEPENDENT UPON DATA TYPE AND OPCODES OF THE VIM INSTRUCTIONS.<br><br>ARITHMETIC FLAGS ← MAU IF (DXV1 & CS1=MA OR MD)<br><br>ARITHMETIC FLAGS ← ALU IF (DXV1 & CS1=AD) OR IF (DXV2 & CS1=MA)<br><br>ARITHMETIC FLAGS ← DSU IF (DXV2 & CS1=MD OR AD)<br><br>ARITHMETIC FLAGS ARE NOT AFFECTED FOR DXV3 |

FIG. 13A

| CS4 | SELECTION OF LOAD OR STORE PLUS TWO ARITHMETIC UNITS |
|---|---|
| 000 | LOAD PLUS MAU PLUS ALU |
| 001 | LOAD PLUS MAU PLUS DSU |
| 010 | LOAD PLUS ALU PLUS DSU |
| 011 | RESERVED |
| 100 | STORE PLUS MAU PLUS ALU |
| 101 | STORE PLUS MAU PLUS DSU |
| 110 | STORE PLUS ALU PLUS DSU |
| 111 | RESERVED |

FIG. 13B

| CS5 | SELECTION OF ONE OR TWO ARITHMETIC UNITS |
|---|---|
| 000 | MAU |
| 001 | ALU |
| 010 | DSU |
| 011 | RESERVED |
| 100 | MAU PLUS ALU |
| 101 | MAU PLUS DSU |
| 110 | ALU PLUS DSU |
| 111 | RESERVED |

FIG. 13C

| CS6 | SELECTION OF LOAD OR STORE PLUS AN ARITHMETIC UNIT |
|---|---|
| 000 | LOAD PLUS MAU |
| 001 | LOAD PLUS ALU |
| 010 | LOAD PLUS DSU |
| 011 | RESERVED |
| 100 | STORE PLUS MAU |
| 101 | STORE PLUS ALU |
| 110 | STORE PLUS DSU |
| 111 | LOAD PLUS STORE |

FIG. 14A

COMPOUND LOAD/STORE PLUS DOUBLE ARITHMETIC OFFSET XV — 1400

| 31 30 29 28 27 26 25 | 24 23 22 21 20 | 19 18 17 16 | 15 14 13 12 | 11 10 9 8 | 7 6 | 5 4 3 2 1 0 |
|---|---|---|---|---|---|---|
| GROUP S/P CXV1 | UAF2 CS4 | M/A RtOfs | M/A RxOfs | M/A RyOfs | A/D RtOfs | A/D RxOfs A/D RyOfs L/S RtOfs 6-BIT VOFS |

COMPOUND SINGLE ARITHMETIC OFFSET XV — 1420

| 31 30 29 28 27 26 25 | 24 23 | 22 21 20 | 19 18 17 16 | 15 14 13 12 | 11 10 9 8 | 7 6 | 5 4 3 2 1 0 |
|---|---|---|---|---|---|---|---|
| GROUP S/P CXV2 | UAF2 | CS5=000, 001, 010 | M/A/D RtOfs | M/A/D RxOfs | M/A/D RyOfs | Vb | 7-BIT VOFS |

COMPOUND DOUBLE ARITHMETIC OFFSET XV — 1440

| 31 30 29 28 27 26 25 | 24 23 | 22 21 20 | 19 18 | 17 16 | 15 14 | 13 12 | 11 10 | 9 8 | 7 6 | 5 4 3 2 1 0 |
|---|---|---|---|---|---|---|---|---|---|---|
| GROUP S/P CXV2 | UAF2 | CS5=100, 101, 110 | M/A RtOfs | M/A RxOfs | M/A RyOfs | A/D RtOfs | A/D RxOfs | A/D RyOfs | Vb | 7-BIT VOFS |

COMPOUND LOAD/STORE PLUS ARITHMETIC OFFSET XV

| 31|30 | 29 | 28|27|26|25|24|23 | 22|21|20 | 19|18|17 | 16|15|14 | 13|12|11 | 10|9|8 | 7 | 6|5|4|3|2|1|0 |
|---|---|---|---|---|---|---|---|---|---|
| GROUP | S/P | CXV3 | UAF2 | CS6=000, 001, 010, 100, 101, 110 | M/A/D RtOfs | M/A/D RxOfs | M/A/D RyOfs | L/S RtOfs | Vb | 7-BIT VOFS |

COMPOUND LOAD AND STORE OFFSET XV

| 31|30 | 29 | 28|27|26|25|24|23 | 22|21|20 | 19|18|17|16|15|14 | 13|12|11|10|9|8 | 7 | 6|5|4|3|2|1|0 |
|---|---|---|---|---|---|---|---|---|
| GROUP | S/P | CXV3 | UAF2 | CS6=111 | LOAD RtOfs | STORE RtOfs | Vb | 7-BIT VOFS |

COMPOUND LOAD/STORE PLUS DOUBLE ARITHMETIC RFI XV — 1600

| 31 30 29 28 27 26 25 | 24 23 22 21 20 | 19 18 | 17 16 | 15 14 | 13 12 | 11 10 | 9 8 | 7 6 | 5 4 3 2 1 0 |
|---|---|---|---|---|---|---|---|---|---|
| GROUP S/P RFIXV1 | UAF2 CS4 | M/A RtInc | M/A RxInc | M/A RyInc | A/D RtInc | A/D RxInc | A/D RyInc | L/S RtInc | 6-BIT VOFS |

COMPOUND DOUBLE ARITHMETIC RFI XV — 1620

| 31 30 29 28 27 26 25 | 24 23 22 21 20 | 19 18 | 17 16 | 15 14 | 13 12 | 11 10 | 9 8 | 7 | 6 5 4 3 2 1 0 |
|---|---|---|---|---|---|---|---|---|---|
| GROUP S/P RFIXV2 | UAF2 CS5 | M/A RtInc | M/A RxInc | M/A RyInc | A/D RtInc | A/D RxInc | A/D RyInc | Vb | 7-BIT VOFS |

COMPOUND LOAD/STORE PLUS ARITHMETIC RFI XV — 1640

| 31 30 29 28 27 26 25 24 23 | 22 21 20 | 19 18 17 | 16 15 14 | 13 12 11 | 10 9 8 | 7 | 6 5 4 3 2 1 0 |
|---|---|---|---|---|---|---|---|
| GROUP S/P RFIXV3 UAF2 | CS6=000, 001, 010, 100, 101, 110 | M/A/D RtInc | M/A/D RxInc | M/A/D RyInc | L/S RtInc | Vb | 7-BIT VOFS |

COMPOUND LOAD AND STORE RFI XV — 1660

| 31 30 29 28 27 26 25 24 23 | 22 21 20 | 19 18 17 16 15 14 | 13 12 11 10 9 8 | 7 | 6 5 4 3 2 1 0 |
|---|---|---|---|---|---|
| GROUP S/P RFIXV3 UAF2 | CS6 =111 | LOAD RtInc | STORE RtInc | Vb | 7-BIT VOFS |

1661, 1662, 1670, 1672

METHODS AND APPARATUS FOR INDIRECT COMPOUND VLIW EXECUTION USING OPERAND ADDRESS MAPPING TECHNIQUES

FIELD OF THE INVENTION

The present invention relates generally to techniques to improve processor performance through improvements in indirect VLIW architectures. More particularly, the present invention provides techniques for reducing the average load VLIW latency while improving overall utilization of stored VLIWs. In addition, use of two and three issue indirect VLIWs is enhanced providing improved performance.

BACKGROUND OF THE INVENTION

Application programs can be considered to comprise sequential code segments with low levels of instruction level parallelism (ILP), such as control code, and code segments with high levels of ILP which are referred to herein as parallel code. Both of these code types are intermixed in an application program and both need to be efficiently processed to achieve high performance for the whole program. The case of pure sequential code with no available ILP and pure parallel code with no control constructions such as branches does not typically exist in a whole program application except possibly for very small code segments. In order to develop a high performance processor that does well on both sequential and parallel code, it is important to consider how to support small levels of instruction parallelism in sequential code, how to minimize the latency to support parallel execution, how to more flexibly support parallel execution, and how to improve code density.

An indirect VLIW processor, such as the BOPS, Inc. Manta and Mobile Media Processor (MMP) both subsets of the ManArray architecture, use an execute VLIW (XV) indirect instruction mechanism for accessing multiple instruction VLIWs for execution to achieve high levels of selectable parallelism. The expense of using the indirect VLIWs in the Manta and MMP is primarily a load VLIW latency associated with loading VLIWs into local VLIW memories (VIMs). The Manta and MMP use a Load VLIW (LV) instruction to load VLIWs into local VIMs where the load latency is equal to the number of instructions to be loaded plus one for the LV. For a five issue VLIW, the LV latency is 6-cycles. If a specific VLIW utilization is low as would be the case in sequential code where ILP is low, then VLIWs would typically not be used due to the increased overhead load flowing from VLIW latency. For example, to store a two-issue VLIW in VIM would cost two instructions plus the LV and to execute the two-issue VLIW would cost one additional cycle for the XV for a total of 4 cycles. If the code segment was executed without use of the VLIW, it would cost only 2 cycles. For the case of a three-issue VLIW, it would cost 3(instructions)+1(LV)+1(XV)=5 cycles as compared to a cost of executing the code directly of only 3 cycles. The indirect VLIWs were designed to support high usage VLIWs such as found in digital signal processing (DSP) type loops where the load latency is essentially insignificant and the overall performance gain is very high. Utilizing a Manta, an MMP, or similar indirect VLIW architecture to mine the available ILP in sequential code, however, is not cost effective.

SUMMARY OF THE INVENTION

In order to develop a high performance processor that effectively handles both sequential and parallel code, it is important to consider how to support small levels of instruction parallelism in sequential code, how to minimize the latency to support parallel execution, how to more flexibly support parallel execution and how to improve code density. The present invention accesses multiple slot instructions of a VLIW instruction for execution to achieve high levels of selectable parallelism and to make improvements to code density. In order to improve both the VLIW processor utilization and minimize the effects of loading the VLIWs into VIM, according to one aspect, the present invention provides for reusing a previously stored VLIW instruction by allowing the stored VLIW instruction to be used in more than one context.

To such ends, the present invention includes a short instruction word (SIW) register for holding a SIW. The SIW includes an indication of a slot instruction to execute and a dynamic slot instruction operand which may be used by the indicated slot instruction. Further, the present invention includes a register for holding slot instructions which are retrieved from VLIW memory. The retrieved slot instructions include a stored operand which is typically used when executing the retrieved slot instruction. The present invention may further suitably include a controller and an execution unit. The controller selects which of the operands are utilized with the retrieved slot instructions to form a transformed slot instruction. The execution unit executes the transformed slot instructions with the selected operand.

A more complete understanding of the present invention, as well as further features and advantages of the invention, will be apparent from the following Detailed Description and the accompanying drawings.

BRIEF DESCRIPTION OF THE DRAWINGS

FIG. 6A illustrates a CS1 encoding table for encoding the selection of two arithmetic units for use in direct mapped compound XV instructions;

FIG. 6B illustrates a CS2 encoding table for encoding the selection of a load unit plus arithmetic unit or store unit for use in direct mapped compound XV instructions;

FIG. 6C illustrates a CS3 encoding table for selection of a store unit plus arithmetic unit for use in direct mapped compound XV instructions;

FIG. 7 illustrates an opcode encoding table for control instructions including five new direct mapped compound XV instruction opcodes;

FIG. 8A illustrates a compound load plus arithmetic XV (LAXV) instruction format;

FIG. 8B illustrates a syntax and operation table for an LAXV instruction;

FIG. 10A illustrates a compound store plus arithmetic XV (SAXV) instruction format;

FIG. 10B illustrates a syntax and operation table for an SAXV instruction;

FIG. 11A illustrates a double arithmetic compound XV (DXV1/2/3) instruction format;

FIG. 11B illustrates a syntax and operation table for a DXV1/2/3 instruction;

FIG. 13A illustrates a CS4 encoding table for selection of a load or store unit plus two arithmetic units for use in offset and register file indexing (RFI) compound XV instructions;

FIG. 13B illustrates a CS5 encoding table for selection of one or two arithmetic units for use in offset and RFI compound XV instructions;

FIG. 13C illustrates a CS6 encoding table for selection of a load or store unit plus an arithmetic unit for use in offset and RFI compound XV instructions;

FIG. 14A illustrates a compound load/store plus double arithmetic offset XV instruction format;

FIG. 14B illustrates a compound single arithmetic offset XV instruction format;

FIG. 14C illustrates a compound double arithmetic offset XV instruction format;

FIG. 14D illustrates a compound load/store plus arithmetic offset XV instruction format;

FIG. 14E illustrates a compound load and store offset XV instruction format;

FIG. 16A illustrates a compound load/store plus double arithmetic RFI XV instruction format;

FIG. 16B illustrates a compound double arithmetic RFI XV instruction format;

FIG. 16C illustrates a compound load/store plus arithmetic RFI XV instruction format; and FIG. 16D illustrates a compound load and store RFI XV instruction format.

DETAILED DESCRIPTION

Figure 1:
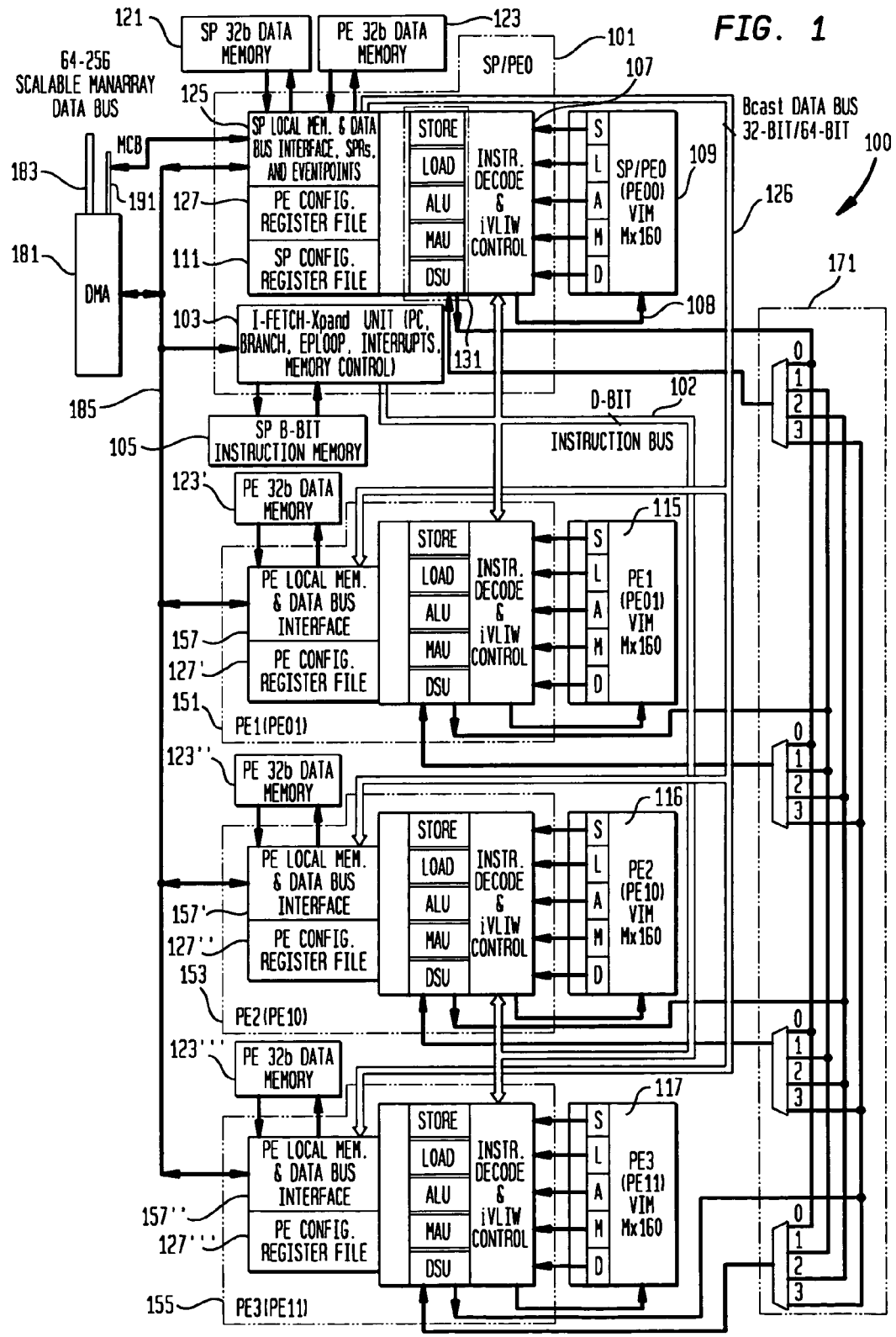
FIG. 1 illustrates a Manta-type processor, a subset of the ManArray architecture, which may be suitably adapted for use in conjunction with the present invention.

A number of aspects of the present invention address improvements to the ManArray architecture for increased performance due to use of compound execute VLIW type of instructions for both sequential and parallel code. In a presently preferred embodiment of the present invention, an exemplary ManArray 2×2 iVLIW single instruction multiple data stream (SIMD) processor 100 may suitably be employed. Processor 100 is representative of the Manta processor and the mobile media processor (MMP), both subsets of the ManArray architecture and is shown in FIG. 1. The array processor 100 shown in FIG. 1 comprises a sequence processor (SP) controller combined with a processing element-0 (PE0) SP/PE0 101, as described in further detail in U.S. Pat. No. 6,219,776, for example. Three additional PEs 151, 153, and 155, are also utilized to demonstrate a number of general extensions to the indirect VLIW architecture in accordance with the present invention. It is noted that PEs can also be labeled with their matrix positions as shown in parentheses for PE0 (PE00) 101, PE1 (PE01) 151, PE2 (PE10) 153, and PE3 (PE11) 155. The SP/PE0 101 contains a fetch controller 103 to allow the fetching of short instruction words (SIWs) from a 32-bit instruction memory 105. The fetch controller 103 provides the typical functions needed in a programmable processor such as a program counter (PC), branch capability, event point (EP) loop operations (see U.S. patent application Ser. No. 09/598,566 "Methods and Apparatus for Generalized Event Detection and Action Specification in a Processor" filed Jun. 21, 2000 for further details), and support for interrupts. It also provides the instruction memory control which could include an instruction cache if needed by an application. In addition, the SIW I-Fetch controller 103 dispatches 32-bit SIWs to the other PEs in the system by means of the 32-bit instruction bus 102.

In this exemplary system, common elements are used throughout to simplify the explanation, though actual implementations are not limited to the elements shown. For example, the execution units 131 in the combined SP/PE0 101 can be separated into a set of execution units optimized for the control function, for example, fixed-point execution units. Also, the PE0, as well as the other PEs, can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) 109 and an instruction decode and VIM controller function unit 107 which receives instructions as dispatched from the SP/PE0's I-Fetch unit 103 and generates the VIM addresses-and-control signals 108 required to access the iVLIWs stored in VIM. Referenced instruction types are identified by the letters SLAMD in VIM 109, where the letters are matched up with instruction types as follows: Store (S), Load (L), ALU (A), MAU (M), and DSU (D).

Figure 2:
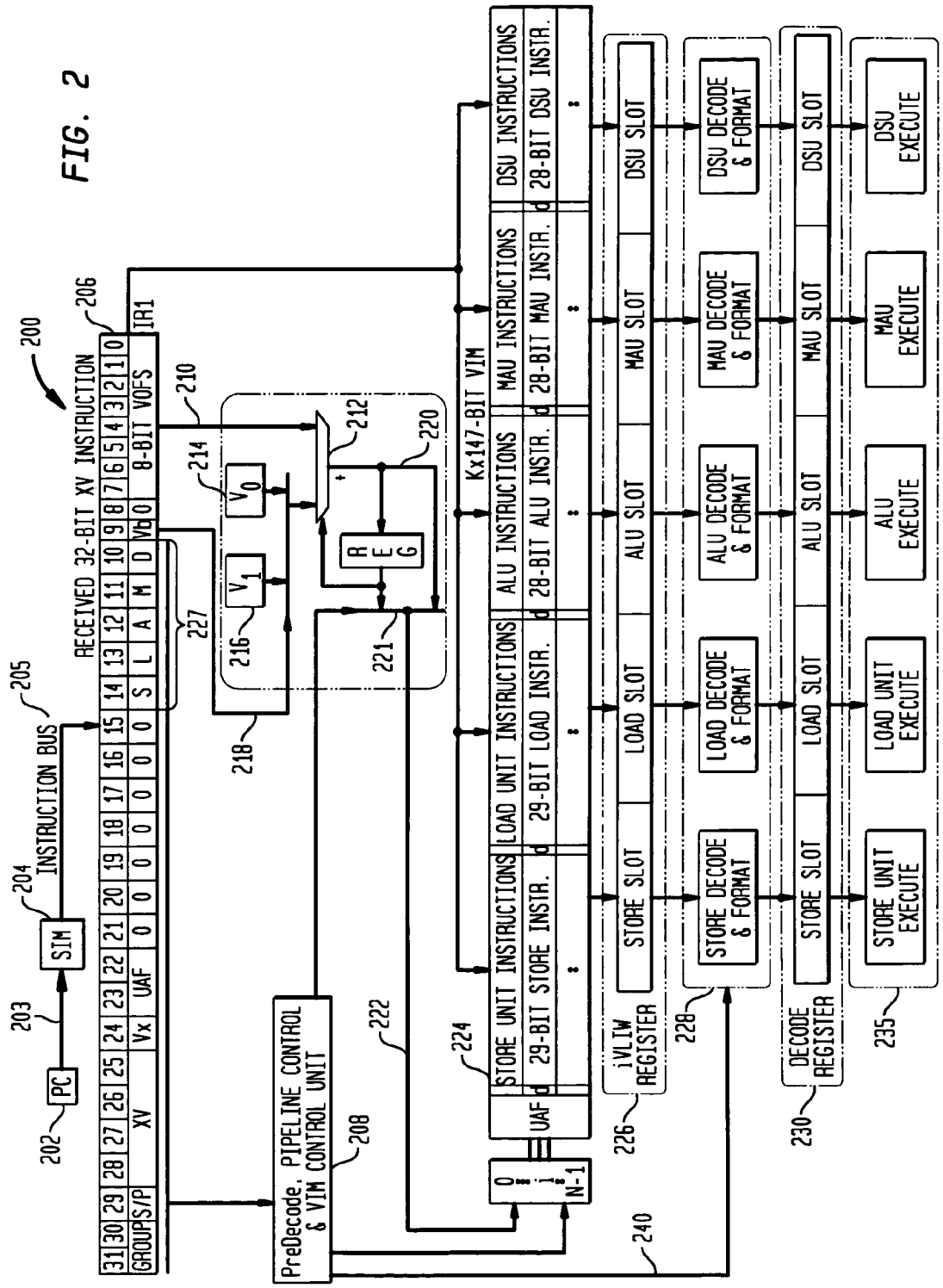
FIG. 2 illustrates a high-level view of an indirect VLIW instruction path as used in a Manta-type processor as shown in FIG. 1.

A high-level view of the indirect VLIW architecture instruction path 200 is shown in FIG. 2. Note for clarity of description, only the basic instruction path is shown and signals and control lines are not generally shown as they may vary depending upon a chosen implementation. The sequence of steps used to fetch and decode a VLIW begin with the program counter (PC) 202 logically supplying an address 203 to the short instruction memory (SIM) 204 which returns a short instruction word (SIW) on instruction bus 205 to a first instruction register (IR1) 206 located in SP/PE0 and the other PEs. In the next cycle after the fetch, the instruction in IR1 is determined to be an execute VLIW (XV) in a predecode section of logic 208 and whether it is appropriate for execution in the received processing element. For an SIW XV instruction, an offset address, 8-bit VOFS 210, is supplied by the XV instruction in IR1 and added by adder 212 to the contents of a VIM address register, V0 214 or V1 216 as selected by the XV Vb bit 218, to form an address 220 which passes through multiplexer 221 as VIM address 222 to select a VLIW entry in VIM 224. Up to five instructions are returned from VIM 224 and latched in an iVLIW register 226 with slots for each execution unit.

The XV instruction contains a bit-field 227, bits 14-10, which specifies which execution units are enabled to receive instructions from VIM for execution, and those which are not selected deliver no-operation (NOP). In the next cycle, the iVLIW instructions are decoded by decoder 228 and the decoded values and operand addresses are latched in decode register 230. Following these steps, the compute register file is accessed and the instructions are executed by execution units 235. Note that in this basic indirect XV operation, after the XV supplies an offset address, VOFS, to select the VLIW from VIM and indicates which instructions are to be executed over signal path 240, the XV is completely replaced by the instructions fetched from VIM. The instructions stored in VIM are not modified and for a specific VLIW to be used more than once, in other words, invoked by an XV in more than one place in the code, the VLIW must be used with exactly the same instruction combination and with exactly the same register values and instruction control bits. For further details of the basic concept of loading of iVLIWs, see U.S. Pat. No. 6,151,668. Also contained in the SP/PE0 and the other PEs is a common design compute register file 111, 127, 127', 127" and 127'". Each of these register files is preferably a configurable register file, such as the ones described in further detail in U.S. Pat. No. 6,343,356.

Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32-bit or 64-bit broadcast data bus 126. The other PEs, 151, 153, and 155 contain common design physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is a cluster switch 171 various aspects of which are described in greater detail in U.S. Pat. No. 6,023,753, U.S. Pat. No. 6,167,502, and U.S. Pat. No. 6,167,501.

The interface to a host processor, other peripheral devices, and/or external memory can be implemented in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via a multiplexed bus interface symbolically represented by 185. A high level view of a ManArray Control Bus (MCB) 191 is also shown in FIG. 1.

In order to improve both the VLIW utilization and minimize the effects of loading the VLIWs into VIM it is desirable to make the VLIW architecture as flexible as possible and to allow a stored VLIW to be used in more than one context. In general, the present invention addresses such ends as follows. Information from an XV-type instruction is used to dynamically transform information from a referenced VLIW by replacement or by a modification method to produce a new set of VLIW instructions to be executed in parallel. Also, a new type of XV instruction is provided which supplies dynamic information and combines with previously loaded VLIWs in VIM. This illustration will be referred to herein as a compound XV.

Figure 3:
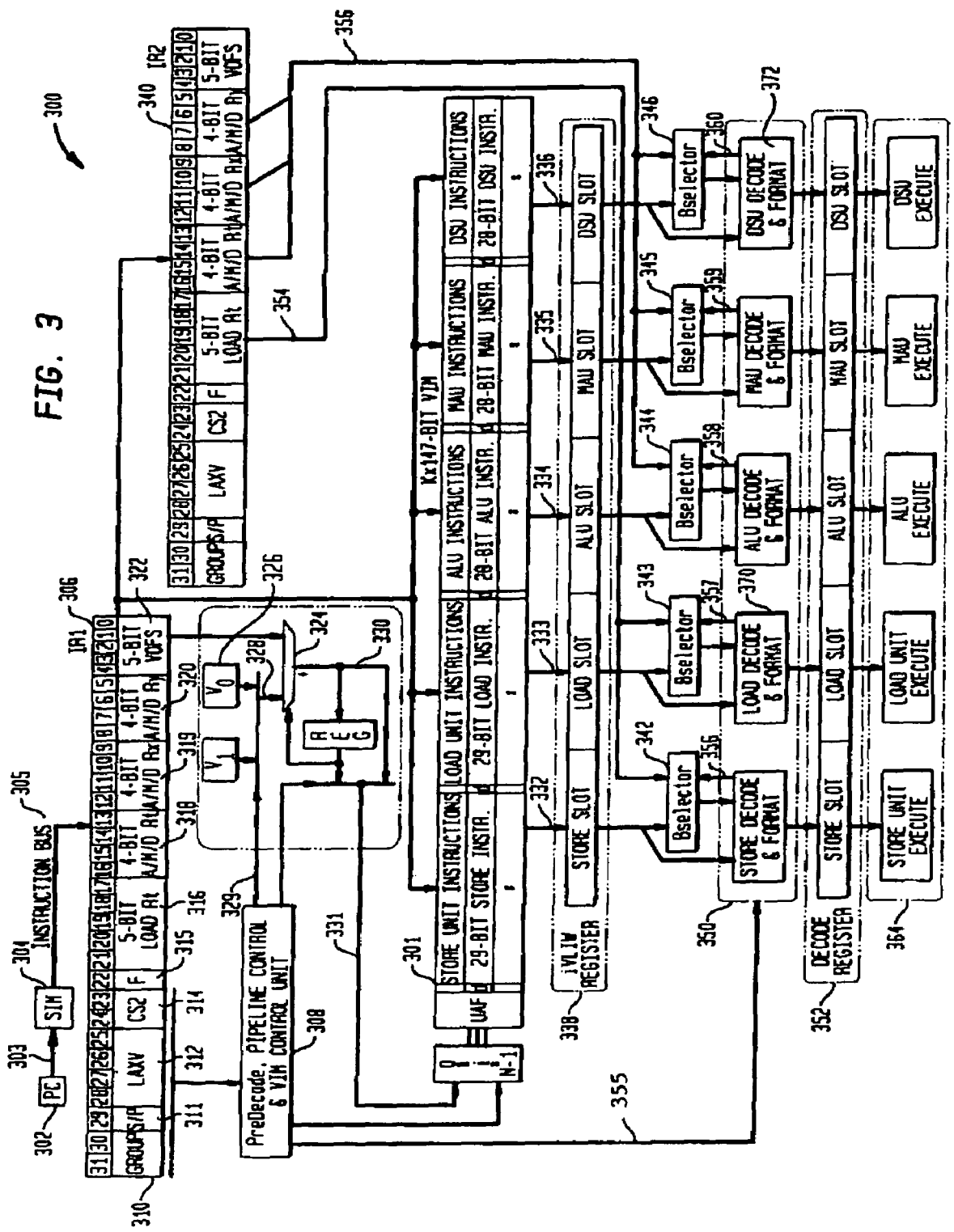
FIG. 3 illustrates a high-level view of an example of an indirect VLIW instruction path that supports compound XV instructions.

FIG. 3 illustrates an example of a high-level indirect VLIW instruction path 300 for a processor that supports compound XV instructions. Note that for clarity of description, FIG. 3 shows only the VLIW instruction path and not the short instruction word bypass VIM path that is available in the Manta and MMP processors. Further, all signal and control lines required in a particular implementation, such as supporting the VIM which signals and control lines which may vary depending upon the chosen implementation technology, are not shown for purposes of clarity of illustration.

The sequence of steps used to fetch and decode a VLIW from VIM 301 using a compound XV begins with the program counter PC 302 logically supplying an address 303 to the short instruction memory (SIM) 304 which returns a short instruction word (SIW) on an instruction bus 305, a compound XV, for this example, to a first instruction register (IR1) 306. The next cycle after the fetch, a predecode section of logic 308 that determines the instruction in IR1 306 is a compound XV and appropriate for execution on this processing element. Specifically, a load and arithmetic operation are two joint operations which are encoded into the compound LAXV instruction format stored in IR1 306. The specific bit fields are as follows:

- Group bits (31, 30) 310 set to 01 to indicate that this instruction is a control flow instruction
- S/P bit (29) 311 identifies whether the instruction is to be executed in the SP or in the PEs
- LAXV opcode bits (28-25) 312 further identify the control flow instruction as a compound load and arithmetic instruction
- CS2 control bits (24, 23) 314 specify which arithmetic unit is to be combined with a load instruction
- F bit (22) 315 is used to indicate whether the selected arithmetic unit is to affect the flags (F=1) or not affect the flags (F=0)
- 5-bit Load Rt bits (21-17) 316 are substituted for Load Rt bits of the Load instruction accessed from VIM
- 4-bit A/M/D Rt bits (16-13) 318 are substituted for bits in the CS2 selected arithmetic unit ALU/MAU/DSU (A/M/D) instruction Rt bit field accessed from VIM
- 4-bit A/M/D Rx bits (12-9) 319 are substituted for bits in the CS2 selected arithmetic unit A/M/D instruction Rx bit field accessed from VIM
- 4-bit A/M/D Ry bits (8-5) 320 are substituted for bits in the CS2 selected arithmetic unit A/M/D Ry bit field accessed from VIM
- 5-bit VOFS bits (4-0) 322 specify the VIM offset field which is added by adder 324 to VIM base address register V0 326 as selected by multiplexer 328 and control signal 329 to form an address 330 selected for output on multiplexer output 331 to select a VLIW entry in VIM 301.

In order to save the need for a Vb bit in the compound XV encoding format, as used in the XV of FIG. 2, V0 is specified by the architecture to be used for this instruction, as determined in the predecode logic to generate control signal 329 at the correct time. Also, as controlled by the predecode unit logic 308, a 5-bit VOFS 322 is used for the LAXV VIM address calculation instead of an 8-bit VOFS as was used in the XV of FIG. 2.

Up to five instructions are returned from VIM 332-336 and latched in an iVLIW register 338 with slots for each execution unit. Concurrent with the VIM access, the compound XV instruction is further decoded to determine the method of transforming the accessed VLIW selected instructions using information supplied by the compound XV and the compound XV instruction is then stored in instruction register 2 (IR2) 340. The compound XV instruction contains a field CS2 314 which specifies which execution units are to receive instructions from VIM, and those which are not selected deliver no-operation. During the next cycle, the selected instructions are transformed, including operand addresses, using bit field selector (Bselector) multiplexers 342-346, for example. Then, the instructions are decoded and formatted by store decode and format units 350 and latched in their respective decode registers 352. The Bselectors 342-346 are individually organized as specified by the architecture definition of the compound XV instructions to select the specified bit fields from the compound XV instruction instead of specified bit fields in the VIM accessed instruction and to pass through bits which are not to be transformed. Generally, for example, the 5-bit Load Rt bits (21-17) from IR2 354 are selected by either the Store Bselector 342 or the Load Bselector 343 depending on the CS2 specified load or store unit. The concatenated 4-bit fields for Rt, Rx and Ry from IR2 356 are also generally selected by either the ALU Bselector 344, the MAU Bselector 345 or the DSU Bselector 346 depending upon the CS2 selected execution unit. The specific selection controls 356-360 are governed by the predecode logic control signals 355 and a decode of the VIM accessed instruction 350.

A further advantageous aspect of this invention is that the transforming Bselector logic also depends upon the accessed instruction from VIM as shown in an exemplary case for the DSU using decoder signals 360, based on a decode of the VIM accessed DSU instruction opcode and data type along with a decoding of the compound XV that selected the DSU, to signal the DSU Bselector logic 346 to select different bit fields for transformation. This aspect will be discussed in further detail below. In the next cycle, the compute register file is accessed (not shown in FIG. 3) and the instructions are executed by execution units 364, which now have all register addresses and instruction opcodes transformed and fully resolved at the beginning of the execute cycle as was the case for the basic indirect VLIW path illustrated in FIG. 2.

Figure 4:
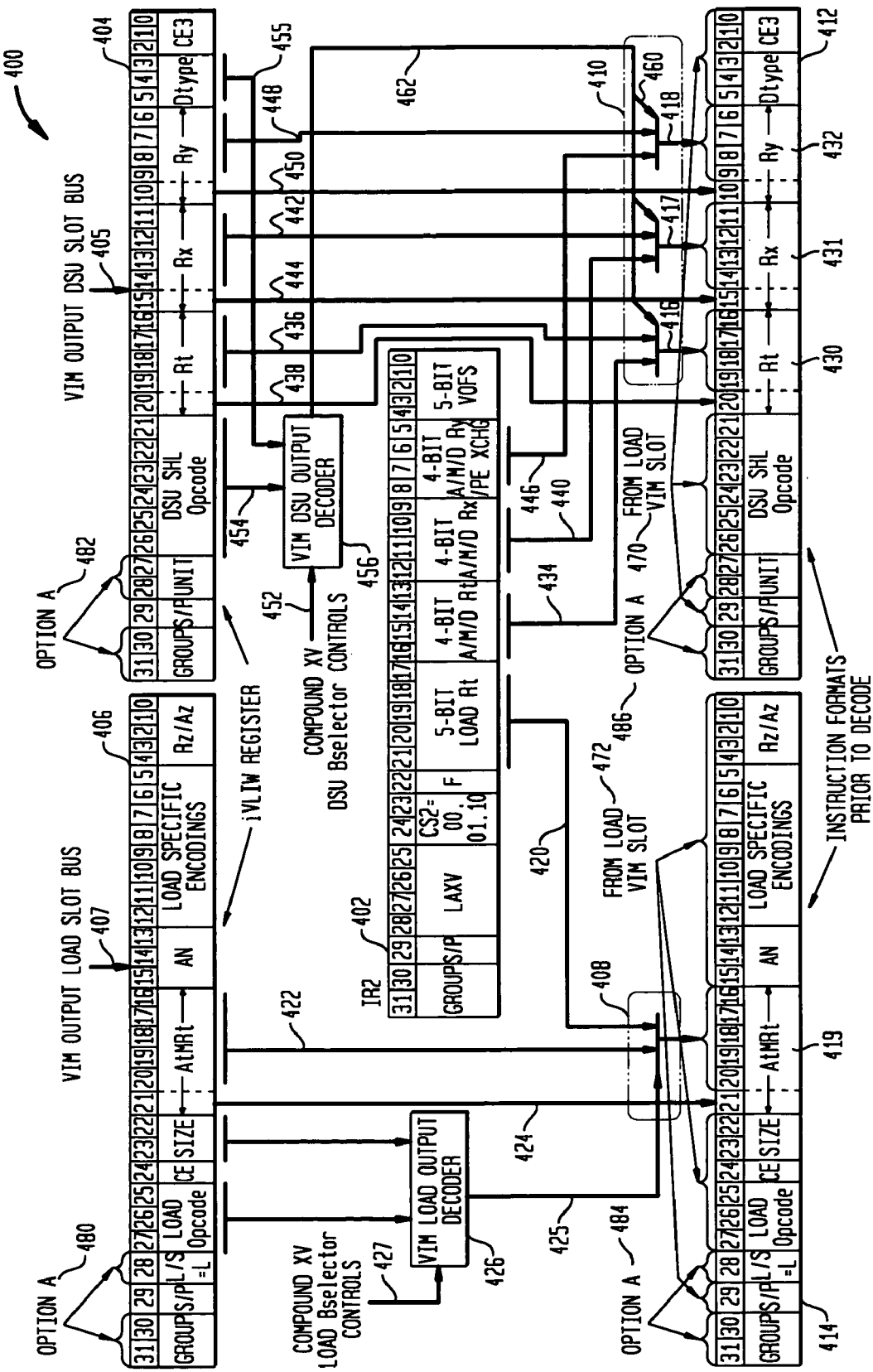
FIG. 4 illustrates a more detailed view of the basic instruction path for an exemplary compound XV operation where a VLIW DSU instruction supports an Ry operand requiring transformation.

FIG. 4 illustrates an example of a VLIW instruction path 400 for 32-bit data type operations for transforming a Load instruction and transforming a DSU instruction, both of which occur in parallel. In FIG. 4, selective bit field multiplexers (Bselectors) 408 and 416-418 are more explicitly shown with their specific input bit fields coming from the LAXV stored in IR2 402, VIM DSU 404, and VIM Load 406 instruction formats than what was shown in FIG. 3. The control path and VIM of FIG. 3 are not shown in FIG. 4 in order to highlight the instruction path.

With regard to the Load instruction transformation, Load register 406 is loaded from VIM Output Load slot bus 407 and the IR2 402 register is loaded with a compound XV instruction in accordance with the discussion of FIG. 3. The data path for the Load transformation includes providing Load Rt bits (21-17) 420 from IR2 402 and AtMRt bits (20-16) 422 from the load register 406 to Bselector logic 408. The VIM Load Output Decoder 426 selects which of these bit fields are placed into the AtMRt field (20-16) 419 of the Load format 414. The Load Bselector 408 is controlled using a signal 425 determined by the VIM Load Output Decoder 426, part of the load decode and format logic 370, combined with signals based on the decoding of the compound XV, such as control signal 427 from the predecode logic illustrated in FIG. 3.

When creating the new Load instruction format 414 to be executed, Load Rt bits (21-17) 420 replace the AtMRt bits (20-16) 422. Bit 21 424, the high order bit of the AtMRt field, is not replaced and used directly in the new Load instruction format 414. Thus, a new Load instruction format 414 has been created and is ready to be executed.

With regard to the DSU instruction transformation, the iVLIW DSU register 404 is loaded from VIM Output DSU slot bus 405. The data path for DSU transformations include selectively multiplexing bit fields 434, 440, and 446 from the IR2 402 and bit fields 436, 442, and 448 from DSU register 404 by Bselectors 416, 417, and 418, respectively. The VIM DSU Output Decoder 456 selects which of these bit fields are placed into bit fields Rt 430, Rx 431, and Ry 432 of DSU format 412, respectively.

When creating a new DSU shift left (SHL) instruction format, the DSU Rt bits (16-13) 434 from IR2 402 replace the Rt bits (19-16) 436 from the VIM accessed DSU instruction 404 and bit 20 438, the high order bit of the Rt field, is not replaced and is used directly in the new DSU instruction format 412. The DSU Rx bits (12-9) 440 from IR2 402 replace the Rx bits (14-11) 442 from the VIM accessed DSU instruction 404 and bit 15 444, the high order bit of the Rx field, is not replaced and is used directly in the new DSU instruction format 412. The DSU Ry bits (8-5) 446 from IR2 402 replace the Ry bits (9-6) 448 from the VIM accessed DSU instruction 404 and bit 10 450, the high order bit of the Ry field, is not replaced and is used directly in the new DSU instruction format 412. The control signals 462 for the Bselectors 410 are different depending on the VIM DSU instruction opcode and data type as specified by the architecture. For the example of an architecture, such as that used in the Manta and MMP processors, the Rt and Rx fields 430 and 431 use appropriate bit field multiplexing logically as shown for any VIM accessed DSU 32-bit data type instruction based on the compound XV DSU Bselector controls 452 generated in the predecode logic and a data type decoding generated in the DSU decoder and format logic 372, such as that shown in FIG. 3. The Ry field is selected as shown only for a selected set of DSU instructions such as the shift and rotate instructions while a different bit field is selected for a different set of DSU instructions. Note that the selection mechanism is based not only on a decode of the compound XV instruction but also on a decode of the VIM accessed instruction.

In more detail, in FIG. 4, the compound XV is decoded to produce the compound XV DSU Bselector controls 452 and the VIM accessed DSU instruction opcode 454 and data type 455 are decoded by decoder 456 and combined with the compound XV decoded signals 452 to generate the Ry Bselector control signal 460. It is noted that the signal line 462 represents a concatenation of multiple control signals as required by the Bselector logic 410. Also, note that other bits that are not transformed such as bits 470 and 472 are passed directly from the iVLIW registers 404 and 406, respectively.

Figure 5:
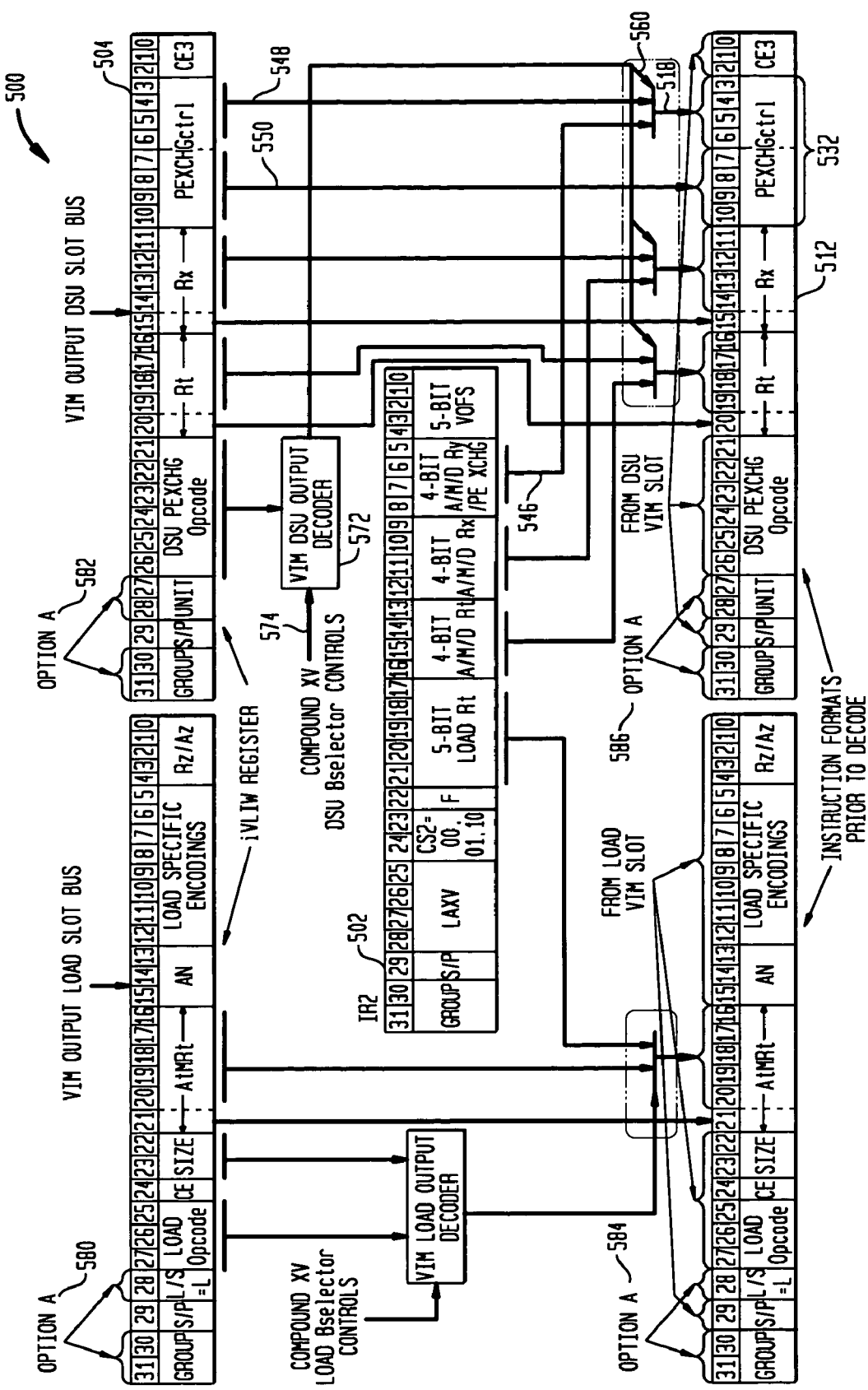
FIG. 5 illustrates a more detailed view of the basic instruction path for an example of a compound XV operation where a VLIW DSU PEXCHG instruction supports a different bit field mapping than the Ry mapping used in FIG. 4.

FIG. 5 illustrates an iVLIW instruction path 500 for the same compound XV example of FIG. 4 with similar reference numbering used, but with the difference that the VIM accessed DSU instruction in the iVLIW register 504 is a PEXCHG instruction. The transformed new PEXCHG instruction 512 to be executed requires a different selection of bits for its PEXCHGctrl field (10-3) 532. Instead of bits (9-6) 448 being replaced as in FIG. 4, bits (6-3) 548 are replaced by the same bits (8-5) 546 of IR2 502. Also, instead of bit (10) 450 being used directly, bits (10-7) 550 are used directly in creating the new DSU PEXCHG instruction 512. Bselector path 518 is logically shown in FIG. 5 for the appropriate bits where the control signal 560 is determined by the VIM DSU output decoder 572, part of the DSU decode and format logic 372, combined with signals based on the decoding of the compound XV, such as compound XV DSU Bselector controls 574.

Immediate operands may also be supplied by a compound XV instruction for instructions such as ADD Immediate XV which contains a 5-bit immediate value instead of an Ry field. The immediate value can be transformed by replacement via Bselector multiplexers as previously described providing a dynamic method of supplying varying immediate values without requiring a new VLIW instruction for each new value. Alternatively, the compound XV supplied immediate bits, located in place of the Ry field bits, can be optionally concatenated with the selected VLIW instruction's immediate field or cause the VLIW supplied immediate field to be scaled by shifting its value left by the specified compound XV supplied immediate bit field, that is supplied instead of the Ry field. In another example, for shift or rotate instructions, which use the arithmetic format Ry field for specifying the number of bits to shift, by transforming the VLIW shift bit field by replacement with the compound XV supplied bits, dynamic shift or rotate amounts may be specified without requiring a new VLIW for each new shift amount.

Additionally, it is noted that the bits labeled Option A 480-486 in FIG. 4 and bits 580-586 of FIG. 5 represent bits which may or may not be used depending upon the needs of a particular implementation. For example, in a Manta processor, when using a load VLIW (LV) instruction to sequentially store the individual instructions making up a VLIW into VIM, the Group and Unit fields for the arithmetic instructions and the Group and L/S fields for the load and store instructions are not stored in the VIM since they were used to determine which slots to load the instructions into in VIM and consequently were considered redundant information. Such treatment can be dependent upon the design.

Generally, there are four factors that are to be specified in order to execute a compound XV instruction. These four factors are 1) VLIW VIM address generation, 2) selection of execution units to operate, 3) specification of operands or other fields that are to be transformed and 4) control information such as how the transform operation is to be done and which unit affects the flags. Some of this information may be implied by the architecture in order to simplify the encoding of the compound XV formats. In other words, the information may be fixed for specific instruction opcodes.

The specific architectural definition of an example of a set of compound XV instructions is described next illustrating how these factors can be specified. Supporting these instruction descriptions are the CSx tables 600, 620, and 640 shown in FIGS. 6A-6C, respectively. These tables specify bit encodings for the selection of specific execution units. For example, in FIG. 6A, the bit field CS1 encoding table 600 provides up to four encodings three of which are used to select two of three execution units as used in a Manta or MMP processor, such as the array processor 100 of FIG. 1, containing an ALU, an MAU and a DSU arithmetic execution units. FIG. 6B specifies for bit field CS2 encoding table 620 the load and arithmetic unit group 622 and load and store combination 624 that can be specified. FIG. 6C specifies for bit field CS3 encoding table 640 the store and arithmetic unit combinations 642 that can be specified.

FIG. 7 illustrates an opcode table 700 which shows an example of an encoding of a control opcode field that could be used for supporting the present invention in a Manta and a MMP processor where five compound XVs are encoded as follows: (1) double arithmetic XV-1 (DXV1) 710, (2) double arithmetic XV-2 (DXV2) 712, (3) double arithmetic XV-3 (DXV3) 714, (4) load unit plus arithmetic or store unit XV (LAXV or LSXV) 716, and (5) store unit plus arithmetic unit XV (SAXV) 718. The previously architected XV 720 which was briefly described above in connection with FIG. 2 is also encoded in the table 700.

The compound load plus arithmetic XV (LAXV) may be suitably encoded in a format 800 shown in FIG. 8A. FIG. 8B identifies a basic instruction syntax and operation description 850 for the LAXV instruction. LAXV is used to execute an indirect two-issue VLIW where the two instructions issued are a load instruction and an arithmetic instruction selected by a CS2 field 815 of FIG. 8A and group bits 622 of FIG. 6B. The iVLIWs that are available for execution by the LAXV instruction are set up ahead of time and stored at individual addresses of the specified SP and/or PE VLIW memory (VIM) 109 and/or 115-117 of FIG. 1, for example. The VIM address is computed as the sum of a base VIM address register V0 plus an unsigned 5-bit offset VOFS 810. The VIM address must be in the valid range for the particular hardware configuration otherwise the operation of this instruction is undefined. The CS2 field 815 selects either an ALU (A), an MSU (M), or a DSU (D) to be jointly executed with a load instruction 855. The LAXV 5-bit load Rt operand field 820 replaces the five least significant bits of the selected VIM load instruction's Rt operand field, depending upon the load data type. The LAXV A/M/D Rt 822, Rx 824 and Ry 826 4-bit fields replace the least significant bits of the associated ALU/MAU/DSU Rt, Rx and Ry of the CS2 selected VIM arithmetic instruction, respectively, depending upon the opcode and arithmetic data type of the VIM accessed CS2 selected instruction.

Specifically, for 32-bit load instructions, the LAXV substitutes bits 20-16 from the accessed VIM load instruction with bits 21-17 from the LAXV instruction 820. For 64-bit load operations to the compute register file, the LAXV substitutes bits 20-17 from the accessed VIM load instruction with bits 21-18 from the LAXV instruction. Note this replacement is another example where the VIM accessed instruction affects the Bselector. In this case, the data type of the load instruction, specified in a Size field, is decoded and combined with decoded compound XV signals to create the Bselector control signals. Similarly, for 32-bit arithmetic operations the LAXV substitutes bits 19-16 (Rt), bits 14-11 (Rx), bits 9-6 (Ry) from the CS2 selected VIM arithmetic instruction with bits 16-13 (Rt) 822, bits 12-9 (Rx) 824 and bits 8-5 (Ry) 826 respectively, from the LAXV instruction. For 64-bit arithmetic operations, the LAXV substitutes bits 20-17 (Rt), bits 15-12 (Rx) and bits 10-7 (Ry) from the CS2 selected arithmetic accessed VIM instruction with bits 16-13 (Rt), bits 12-9 (Rx) and bits 8-5 (Ry) respectively, from the LAXV instruction. For CS2 selected units, the VLIW disable flag is ignored. Note that in processors with more than two VLIW slots, the slot positions not selected are treated as disabled allowing multiple two-issue slot combinations to be packed into each VIM line. The LAXV overrides the LV/SETV UAF setting and uses the arithmetic unit selected by CS2 to specify the flags. Specifically, if flag bit F=1, then the CS2 selected ALU (A), MAU (M) or DSU (D) affects the arithmetic flags 860 and if flag bit F=0 then no unit affects the arithmetic flags 862. Thus, the compound XV instruction that executes two instructions takes 1-cycle for 1-cycle execute instructions.

The instruction syntax specifies the operands needed as follows:

laxv.[SP] Vk, cs2, f=[0-1], loadRt=[0-31], cs2Rt=[0-15], cs2Rx=[0-15], cs2Ry=[0-15]

which specifies the [SP]=SP or PE as the target processing element, the Vk unsigned 5-bit VIM address offset VOFS, the CS2 selected arithmetic unit from the VLIW, whether the CS2 selected unit affects the flags f=[01], and the values substituted for the loadRt, and CS2 selected arithmetic unit's Rt, Rx and Ry where the operational replacement policy is dependent upon the load unit and the CS2 selected VLIW instruction's data type and selected opcodes, as specified by an implementation's architecture.

Three examples for using the LAXV are shown in Table 1 below.

TABLE 1

| Instruction | Operation |
|---|---|
| lim.s.h0 V0, 0 | Load SP VIM base address register V0 with a zero, beginning of VIM |
| lim.p.h0 V0, 0 | Load PE VIM base address registers V0 with a zero, beginning of VIMs |
| laxv.s 0, cs2 = a, f = 0, loadRt = 2, aRt = 4, aRx = 2, aRy = 6 | Execute unconditionally the Load and ALU instruction contained in the VLIW at SP VIM address 0. The 5 least significant bits of the Load Rt and the 4 least significant bits of the CS2 selected ALU instruction's Rt, Rx and Ry are supplied by the laxv instruction, loadRt = 2, aRt = 4, aRx = 2, aRy = 6 for 32-bit data types. Condition flags are not affected. |
| laxv.p 5, cs2 = m, f = 1, loadRt = 10, mRt = 2, mRx = 12, mRy = 8 | On each unmasked PE, execute unconditionally the load and MAU instructions at PE VIM address 5. The 5 least significant bits of the Load Rt and the 4 least significant bits of the CS2 selected MAU instruction's Rt, Rx and Ry are supplied by the laxv instruction, loadRt = 10, mRt = 2, mRx = 12, mRy = 8 for 32-bit data types. The MAU updates the condition flags. |
| laxv.s 3, cs2 = d, f = 1, loadRt = 6, dRt = 4, dRx = 2, dRy = 8 | Execute unconditionally the Load and DSU instructions in the VLIW at SP VIM address 3. The 5 least significant bits of the Load Rt and the 4 least significant bits of the CS2 selected DSU instruction's Rt, Rx and Ry are supplied by the laxv instruction, loadRt = 6, dRt = 4, dRx = 2, dRy = 8 for 32-bit data types. The DSU updates the condition flags. |

Figures 9A, 9B:
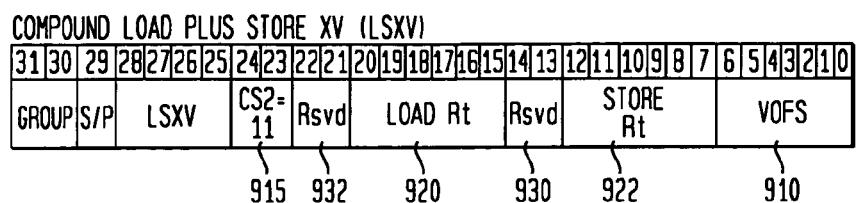
FIG. 9A illustrates a compound load plus store XV (LSXV) instruction format.
FIG. 9B illustrates a syntax and operation table for an LSXV instruction.

The compound load plus store XV (LSXV) may be suitably encoded in a format 900 shown in FIG. 9A. FIG. 9B identifies the basic instruction syntax and operation description 950 for the LSXV instruction. LSXV is used to execute an indirect two-issue VLIW where the two instructions issued are a load and a store selected by CS2 field bits 915 of FIG. 9A and array bits 624 of FIG. 6B. The iVLIWs that are available for execution by the LSXV instruction are set up ahead of time and stored at individual addresses of the specified SP and/or PE VLIW memory (VIM) 109 and/or 115-117 of FIG. 1, for example. The VIM address is computed as the sum of a base VIM address register V0 plus an unsigned 7-bit offset VOFS 910. The VIM address must be in the valid range for a particular hardware configuration otherwise the operation of this instruction is undefined. The CS2 field bits 915 are set to 11 which selects a store instruction to be jointly executed with a load instruction 955. In a Manta and MMP class processor, the LSXV 6-bit load Rt operand field 920 replaces the six bits of the selected VIM load instruction's Rt operand field, depending upon the load data type. Similarly, the LSXV 6-bit store Rt operand field 922 replaces the six bits of the selected VIM store instruction's Rt operand field, depending upon the load data type. Specifically, for 32-bit load instructions, the LSXV substitutes bits 21-16 from the accessed VIM load instruction with bits 20-15 from the LSXV instruction 920. For 64-bit load operations to the compute register file, the LSXV substitutes bits 21-17 from the accessed VIM load instruction with bits 20-16 from the LSXV instruction.

Similarly, for 32-bit store instructions the LSXV substitutes bits 21-16 from the accessed VIM store instruction with bits 12-7 from the LSXV instruction 922. For 64-bit store operations from the compute register file to memory, the LSXV substitutes bits 21-17 from the accessed VIM store instruction with bits 12-8 from the LSXV instruction. Note this operation is another example of where the VIM accessed instruction affects the Bselector. In this case, the data type of the load and store instructions, specified in their Size fields, are decoded and combined with decoded compound XV signals to create the Bselector control signals. Note that larger register file mappings may be obtained through use of the two reserved fields 930 and 932. For the load and store slots, the VLIW disable flag is ignored. Note that in processors with more than two VLIW slots, the slot positions not selected are treated as disabled allowing multiple two-issue slot combinations to be packed into each VIM line. Thus, a compound XV instruction that executes two instructions takes 1-cycle for 1-cycle execute load and store instructions.

The instruction syntax specifies the operands needed as follows:

lsxv.[SP] Vk, cs2=11, loadRt=[0-63], storeRt=[0-63]

which specifies the [SP]=SP or PE as the target processing element, the Vk unsigned 7-bit VIM address offset VOFS, the CS2 selected load and store combination from the VLIW and the values substituted for the load and store unit's Rt where the operational replacement policy is dependent upon the selected VLIW load and store instruction's data type and selected opcodes, as specified by an implementation's architecture.

Two examples for using the LSXV are shown in Table 2.

TABLE 2

| Instruction | Operation |
|---|---|
| lim.s.h0 V0, 0 | Load SP VIM base address register V0 with a zero, beginning of VIM |
| lim.p.h0 V0, 0 | Load PE VIM base address registers V0 with a zero, beginning of VIMs |
| lsxv.s 0, cs2 = 11, loadRt = 2, storeRt = 5 | Execute unconditionally the load and store instruction contained in the VLIW at SP VIM address 0. The 6 bits of the Load Rt and the 6 bits of the Store Rt are supplied by the lsxv instruction, loadRt = 2, storeRt = 5 for 32-bit data types. |
| lsxv.p 5, cs2 = 11, loadRt = 10, storeRt = 8 | On each unmasked PE, execute unconditionally the load and store instructions at PE VIM address 5. The 6 bits of the Load Rt and the 6 bits of the Store Rt are supplied by the lsxv instruction, loadRt = 10, storeRt = 8 for 32-bit data types. |

The compound store plus arithmetic XV (SAXV) may be suitably encoded in a format 1000 shown in FIG. 10A. FIG. 10B identifies the basic instruction syntax and operation description 1050 for the SAXV instruction. SAXV is used to execute an indirect two-issue VLIW where the two instructions issued are a store and an arithmetic selected by the CS3 field bits 1015 and group bits 642 of FIG. 6C. The iVLIWs that are available for execution by the SAXV instruction are set up ahead of time and stored at individual addresses of the specified SP and/or PE VLIW memory (VIM) 109 and/or 115-117 of FIG. 1. The VIM address is computed as the sum of a base VIM address register V0 plus an unsigned 5-bit offset VOFS 1010. The VIM address must be in the valid range for the particular hardware configuration otherwise the operation of this instruction is undefined. The CS3 field 1015 selects either A or M or D to be jointly executed with a store instruction, 1055. The SAXV 5-bit store Rt operand field 1020 replaces the five least significant bits of the selected VIM store instruction's Rt operand field, depending upon the store data type. The SAXV A/M/D Rt 1022, Rx 1024 and Ry 1026 4-bit fields replace the least significant bits of the associated ALU/MAU/DSU Rt, Rx and Ry CS3 selected VIM arithmetic instruction, respectively, depending upon the opcode and arithmetic data type of the VIM CS3 selected instruction. Specifically, for 32-bit store instructions the SAXV substitutes bits 20-16 from the accessed VIM store instruction with bits 21-17 from the SAXV instruction 1020. For 64-bit store operations from the compute register file to memory, the SAXV substitutes bits 20-17 from the accessed VIM store instruction with bits 21-18 from the SAXV instruction. Note this is another example where the VIM accessed instruction affects the Bselector. In this case, the data type of the store instruction, specified in a Size field, is decoded and combined with decoded compound XV signals to create the Bselector control signals. Similarly, for 32-bit arithmetic operations, the SAXV substitutes bits 19-16 (Rt), bits 14-11 (Rx), and bits 9-6 (Ry) from the CS3 selected arithmetic accessed VIM instruction with bits 16-13 (Rt) 1022, bits 12-9 (Rx) 1024 and bits 8-5 (Ry) 1026 respectively, from the SAXV instruction. For 64-bit arithmetic operations, the SAXV substitutes bits 20-17 (Rt), bits 15-12 (Rx) and bits 10-7 (Ry) from the CS3 selected arithmetic accessed VIM instruction with bits 16-13 (Rt), bits 12-9 (Rx) and bits 8-5 (Ry) respectively, from the SAXV instruction. For CS3 selected units, the VLIW disable flag is ignored. Note that in processors with more than two VLIW slots, the slot positions not selected are treated as disabled allowing multiple two-issue slot combinations to be packed into each VIM line. The SAXV overrides the LV/SETV UAF setting and uses the arithmetic unit selected by CS3 to specify the flags. Specifically, if F=1, then the CS3 selected ALU (A), MAU (M) or DSU (D) affects the arithmetic flags 1060. If F=0, then no unit affects the arithmetic flags 1062. Thus, a compound XV instruction that executes two instructions takes 1-cycle for 1-cycle execute instructions.

The instruction syntax specifies the operands needed as follows:

saxv.[S,P] Vk, cs3, f=[0,1], storeRt=[0-31], cs3Rt=[0-15], cs3Rx=[0-15], cs3Ry=[0-15]

which specifies the [SP]=SP or PE as the target processing element, the Vk unsigned 5-bit VIM address offset VOFS, the CS3 selected arithmetic unit from the VLIW, whether the CS3 selected unit affects the flags f=[01], and the values substituted for the storeRt, and CS3 selected arithmetic unit's Rt, Rx and Ry where the operational replacement policy is dependent upon the store unit and the CS3 selected VLIW instruction's data type and selected opcodes, as specified by an implementation's architecture.

Three examples for using the SAXV are shown in Table 3.

TABLE 3

| Instruction | Operation |
| --- | --- |
| lim.s.h0 V0, 0 | Load SP VIM base address register V0 with a zero, beginning of VIM |
| lim.p.h0 V0, 0 | Load PE VIM base address registers V0 with a zero beginning of VIMs |
| saxv.s 0, cs3 = a, f = 0, storeRt = 2, | Execute unconditionally the store and ALU instruction contained in the VL1W at SP VIM address 0. |
| aRt = 4, aRx = 2, aRy = 6 | The 5 least significant bits of the store Rt and the 4 least significant bits of the CS3 selected ALU instruction's Rt, Rx and Ry are supplied by the saxv instruction, storeRt = 2, aRt = 4, aRx = 2 aRy = 6 for 32-bit data types. Condition flags are not affected. |
| saxv.p 5, cs3 = m, f = 1, storeRt = 10, mRt = 2, mRx = 12, mRy = 8 | On each unmasked PE, execute unconditionally the store and MAU instructions at PE VIM address 5. The 5 least significant bits of the store Rt and the 4 least significant bits of the CS3 selected MAU instruction's Rt, Rx and Ry are supplied by the saxv instruction, storeRt = 10, mRt = 2, mRx = 12, mRy = 8 for 32-bit data types. The MAU updates the condition flags. |
| saxv.s 3, cs3 = d, f = 1, storeRt = 6, dRt = 4, dRx = 2, dRy = 8 | Execute unconditionally the store and DSU instructions in the VLIW at SP VIM address 3. The 5 least significant bits of the store Rt and the 4 least significant bits of the CS3 selected DSU instruction's Rt, Rx and Ry are supplied by the saxv instruction, storeRt = 6, dRt = 4, dRx = 2, dRy = 8 for 32-bit data types. The DSU updates the condition flags. |

Compound double arithmetic XV (DXV1/2/3) instructions may be suitably encoded in a format 1100 shown in FIG. 11A. FIG. 11B identifies the basic instruction syntax and operation description 1150 for the DXV1/2/3 instructions of FIG. 11A. DXV1/2/3 are used to execute an indirect two-issue VLIW where the two instructions issued are both arithmetic instructions selected by the CS1 field bits 1115 and group bits 600 of FIG. 6A. The iVLIWs that are available for execution by the DXV1/2/3 instructions are set up ahead of time and stored at individual addresses of the specified SP and/or PE VLIW memory (VIM) 109 and/or 115-117 FIG. 1. The VIM address is computed as the sum of a base VIM address register V0 plus an unsigned 5-bit offset VOFS 1110. The VIM address must be in the valid range for the particular hardware configuration otherwise the operation of this instruction is undefined. The CS1 field bits 1115 select VLIW slot combinations of either [MAU plus ALU] 602 or [MAU plus DSU] 604 or [ALU plus DSU] 606 to be jointly executed, as seen at portion 1155 of operation description 1150. The DXV1/2/3 M/A Rt 1120, Rx 1122 and Ry 1124 3-bit fields replace the least significant bits of the associated MAU/ALU Rt, Rx and Ry CS1 selected VIM arithmetic instruction, respectively, depending upon the opcode and arithmetic data type of the VIM CS1 selected instruction. The DXV1/2/3 A/D Rt 1126, Rx 1128 and Ry 1130 3-bit fields replace the least significant bits of the associated ALU/DSU Rt, Rx and Ry CS1 selected VIM arithmetic instruction, respectively, depending upon the opcode and arithmetic data type of the VIM CS1 selected instruction.

Specifically, for the first DXV1/2/3 M/A operands and 32-bit arithmetic operations, the DXV1/2/3 substitutes bits 18-16 (Rt), bits 13-11 (Rx), bits 8-6 (Ry) from the CS1 selected MAU or ALU accessed VIM instruction with bits 22-20 (Rt) 1120, bits 19-17 (Rx) 1122 and bits 16-14 (Ry) 1124, respectively, from the DXV1/2/3 instruction. For 64-bit arithmetic operations, the DXV1/2/3 substitutes bits 19-17 (Rt), bits 14-12 (Rx) and bits 9-7 (Ry) from the CS1 selected MAU or ALU accessed VIM instruction with bits 22-20 (Rt), bits 19-17 (Rx) and bits 16-14 (Ry), respectively, from the DXV1/2/3 instruction. Note this is another example where the VIM accessed instruction affects the Bselector. In this case, the data type of the arithmetic instruction, specified in a data pack (Dpack) field, is decoded and combined with decoded compound XV signals to create the Bselector control signals.

Similarly, for the second DXV1/2/3 A/D operands and 32-bit arithmetic operations the DXV1/2/3 substitutes bits 18-16 (Rt), bits 13-11 (Rx), and bits 8-6 (Ry) from the CS1 selected ALU or DSU accessed VIM instruction with bits 13-11 (Rt) 1126, bits 10-8 (Rx) 1128, and bits 7-5 (Ry) 1130, respectively, from the DXV1/2/3 instruction. For 64-bit arithmetic operations, the DXV1/2/3 substitutes bits 19-17 (Rt), bits 14-12 (Rx) and bits 9-7 (Ry) from the CS1 selected ALU or DSU accessed VIM instruction with bits 13-11 (Rt), bits 10-8 (Rx) and bits 7-5 (Ry), respectively, from the DXV1/2/3 instruction. For CS1=[MA, MD, AD] selected units, the VLIW disable flag is ignored. Note that in processors with more than two VLIW slots, the slot positions not selected are treated as disabled allowing multiple two-issue slot combinations to be packed into each VIM line. The DXV1/2/3 overrides the LV/SETV UAF setting. The DXV1 has the M/A slot execution unit affect the flags. The DXV2 has the A/D slot execution unit affect the flags. For DXV3, no slot execution unit affects the flags, i.e. F=N. Thus, compound XV instruction that executes two instructions takes 1-cycle for 1-cycle execute instructions.

The instruction syntax specifies the operands needed as follows:

dxv1/2/3.[SP] Vk, cs1, m/aRt=[0-7], m/aRx=[0-7], m/aRy=[0-7], a/dRt=[0-7], a/dRx=[0-7], a/dRy=[0-7]

which specifies the [SP]=SP or PE as the target processing element, the Vk unsigned 5-bit VIM address offset VOFS, the CS1 selected combination of arithmetic units from the VLIW, and the values substituted for the CS1 selected combination of arithmetic unit's Rt, Rx and Ry where the operational replacement policy is dependent upon the CS1 selected VLIW instruction's data type and selected opcodes, as specified by an implementation's architecture.

Three examples for using the DXV1/2/3 are shown in Table 4.

TABLE 4

| Instruction | Operation |
|---|---|
| lim.s.h0 V0, 0 | Load SP VIM base address register V0 with a zero, beginning of VIM |
| lim.p.h0 V0, 0 | Load PE VIM base address registers V0 with a zero, beginning of VIMs |
| Dxv1.s 0, cs1 = ma, mRt = 4, mRx = 2, mRy = 6, aRt = 1, aRx = 3, aRy = 5 | Execute unconditionally the MAU and ALU instruction contained in the VLIW at SP VIM address 0. The 3 least significant bits of the CS1 selected MAU and ALU instruction's Rt, Rx and Ry are supplied by the dxv1 instruction, mRt = 4, mRx = 2, mRy = 6, aRt = 1, aRx = 3, aRy = 5 for 32-bit data types. Condition flags are updated by the MAU. |
| dxv2.p 5, cs1 = md, mRt = 3, mRx = 4, mRy = 5, dRt = 0, dRx = 1, dRy = 2 | On each unmasked PE, execute unconditionally the MAU and DSU instructions at PE VIM address 5. The 3 least significant bits of the CS1 selected MAU and DSU instruction's Rt, Rx and Ry are supplied by the dxv2 instruction, mRt = 3, mRx = 4, mRy = 5, dRt = 0, dRx = 1, dRy = 2 for 32- bit data types. The DSU updates the condition flags. |
| dxv3.s 3, cs1 = ad, aRt = 4, aRx = 2, aRy = 7, dRt = 6, dRx = 2, dRy = 3 | Execute unconditionally the ALU and DSU instructions in the VLIW at SP VIM address 3. The 3 least significant bits of the CS1 selected ALU and DSU instruction's Rt, Rx and Ry are supplied by the dxv2 instruction, aRt = 4, aRx = 2, aRy = 7, dRt = 6, dRx = 2, dRy = 3 for 32-bit data types. The condition flags are not updated. |

It is noted that the previous set of compound XV instructions, the LAXV, LSXV, SAXV and DXV1/2/3, provided the capability to execute two instructions from a VIM simultaneously. In a supporting analysis of application code generated for a Manta processor, the following statistics were found of candidate operations that could use the previously described compound XVs:

MPEG4 sequential code not using VLIWs had approximately 14% pairs of candidate instructions that could use the new forms of compound XVs MPEG4 VLIWs as loaded in VIM had approximately 24% candidate two-issue VLIWs that could have been encoded with the new forms of compound XVs and reduce the number of VLIWs required in VIM MPEG2 sequential code not using VLIWs had approximately 15% pairs of candidate instructions that could use the new forms of compound XVs MPEG2 VLIWs as loaded in VIM had approximately 68% candidate two-issue VLIWs that could have been encoded with the new forms of compound XVs and reduce the number of VLIWs required in VIM Quake3 sequential code not using VLIWs had approximately 10% pairs of candidate instructions that could use the new forms of compound XVs Quake3 VLIWs as loaded in VIM had approximately 13% candidate two-issue VLIWs that could have been encoded with the new forms of compound XVs and reduce the number of VLIWs required in VIM These are significant statistics that imply improved code density, reduced VIM size and improved performance for processors using the described compound XVs. To extend the present examples, it would be necessary to increase the number of instructions that could issue by use of a compound XV from the presently described two-issue VLIWs to three-issue VLIWs. By increasing the VLIW issue rate, additional candidate instruction opportunities in application code for three-issue compound XVs can be found that would further improve code density, reduce VIM, and improve performance beyond the improvements provided by two-issue compound XVs. In order to support a greater issue rate, a different mechanism for dynamically changing VLIW instruction operand addresses and other parameters may be used. One method for increasing the issue rate from two to three is to provide offset values in a new compound XV instruction to be used to calculate the operand addresses instead of simply replacing bit fields as the previous compound XVs have done. This approach, while increasing the issue rate to three instructions per compound XV, trades off operand address range specification with the capability to issue three instructions which needs to be evaluated for specific applications. Both methods provide improved performance.

Such an offset addressing technique specifies each compound XV operand field as an offset value which is scaled by the size of the data operand it refers to as stored in each instruction in a VLIW in VIM. The operand fields in each selected instruction from a VLIW in VIM are treated as base addresses and their associated compound XV operand fields are scaled and then each added to their associated base addresses to produce the final set of operand addresses. This approach allows the use of fewer bits in the compound XV instruction to specify a range of possible operand addresses thereby allowing room to support up to three instructions by the new offset compound XVs. For example, if the referenced VLIW contains an ADD.S.2W R0, R4, R8, then using 2-bit operand-offset specifiers it is possible for a compound XV instruction to create the following variations of this ADD instruction dynamically as part of a compound XV instruction:

ADD.S.2W [R0,R2,R4,R6], [R4,R6,R8,R10], [R8,R10, R12,R14]

ADD.P.2W [R0,R2,R4,R6], [R4,R6,R8,R10], [R8,R10, R12,R14]

where the brackets imply that one register is selected from each group to form an ADD.[SP].2W type of instruction. The scaling occurs as a result of the target operand data types found in each instruction in a VLIW.

Figure 12:
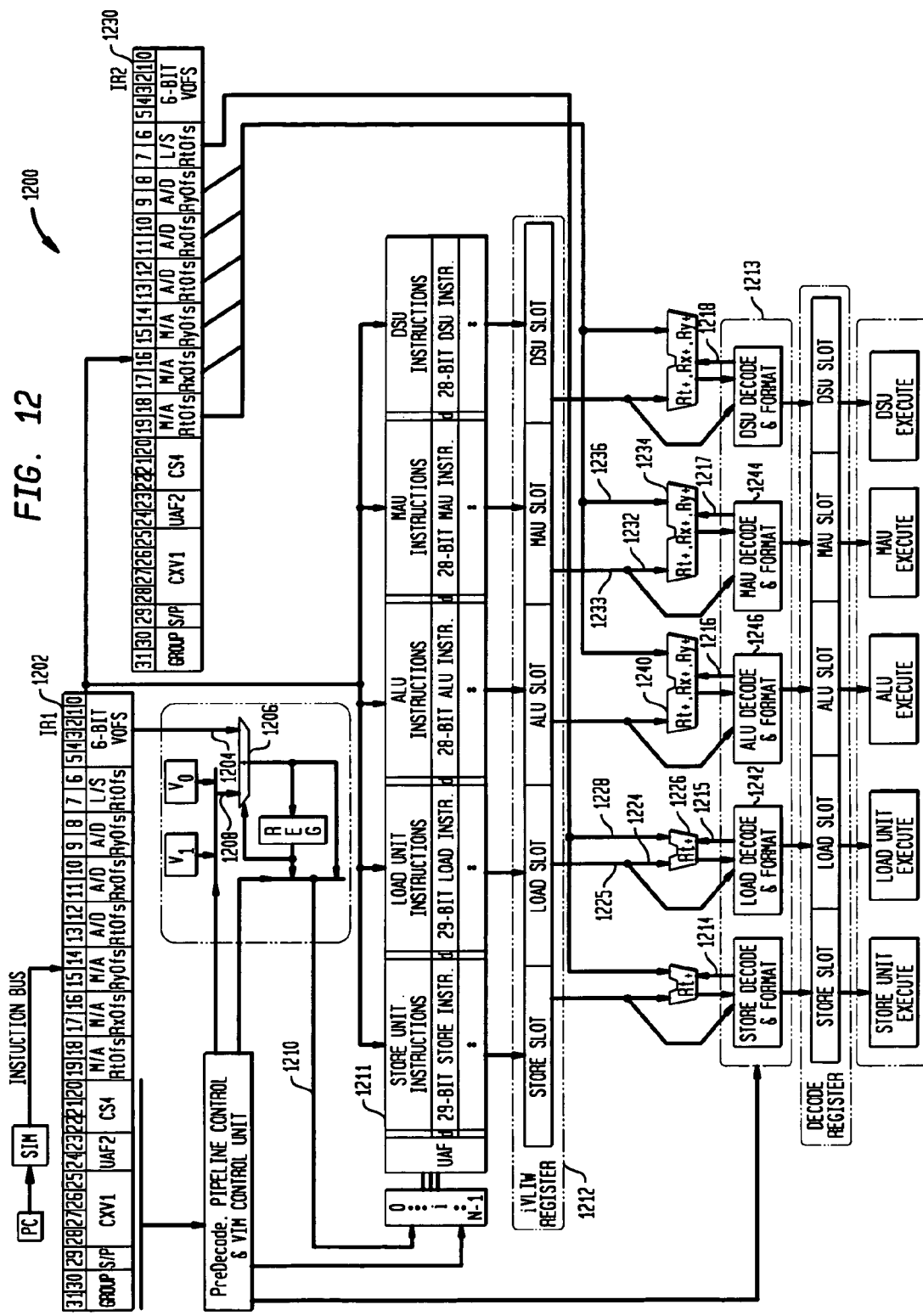
FIG. 12 illustrates a high-level view of an exemplary indirect VLIW instruction path that supports the offset compound XV class of instructions.

FIG. 12 illustrates an example of a compound XV using offsets in an indirect VLIW instruction path 1200. This illustration is similar to FIG. 3 system 300 with the exception that the operand addresses are transformed through an addition of the offset values provided in the compound XV with base operand addresses provided by the VIM VLIW instructions instead of a multiplexing arrangement to select specified bits. The FIG. 12 instruction path hardware functions to select a VLIW from VIM in the same manner as described with the apparatus of FIG. 3. It is during the decode cycle that one, two or three selected slots transform their specified fields. The architectural details of five examples of offset compound XV instructions are described below in order to facilitate a more detailed description of FIG. 12.

Three supporting CSx fields, 1300, 1340, and 1380, shown in FIGS. 13A, B and C, are used in the five examples of offset compound XVs 1400, 1420, 1440, 1460, and 1480 that are shown in FIGS. 14A-14E, respectively. The CS4 1300, CS5 1340 and CS6 1380 encoding tables extend the opcode definition of the offset compound XV such that only three major opcodes are required for the offset compound XVs. The CS4 encoding 1300 specifies six types of three-instruction VLIWs that can be generated from a five instruction VIM access. A group of bits 1302 encodes three Load plus two arithmetic instructions VLIWs while group bits 1304 encode three Store plus two arithmetic instructions VLIWs. The CS5 encoding 1340 specifies six types of single and two-instruction VLIWs that can be generated from a five instruction VIM access. The group bits 1342 encode three single instructions that can be selected, one for each execution unit MAU, ALU, and DSU which is useful for supporting software pipeline loop prolog and epilog sequences and possible future iVLIW extensions. The group bits 1344 encodes three two-instruction VLIWs consisting of combinations of the arithmetic units, [MAU, ALU], [MAU, DSU] and [ALU, DSU]. The CS6 encoding 1380 specifies seven types of two-instruction VLIWs, where for six of the encodings one of the two instructions is either a load or a store instruction, that can be generated from a five instruction VIM access. Group bits 1382 encode three two-instruction VLIWs consisting of combinations of a load instruction and an arithmetic instruction, [Load, MAU], [Load, ALU] and [Load, DSU]. Group bits 1384 encode three two-instruction VLIWs consisting of combinations of a store instruction and an arithmetic instruction, [Store, MAU], [Store, ALU] and [Store, DSU]. Encoding CS6=111 1386 specifies a load and store 2-instruction VLIW.

FIG. 14A illustrates the instruction format 1400 for a Compound Load/Store plus Double Arithmetic Offset XV (CXV1) using opcode 1402. A UAF2 field 1403 is used to identify which arithmetic unit of the two selected by the CS4 field 1404 is enabled to set the flags. For example, a UAF2 set to 00 is reserved, set to 01 allows the first specified execution unit M/A to set the flags, set to 10 allows the second specified execution unit A/D to set the flags and set to 11 is used for the case where no unit is to set the flags. A set of six operand offset fields is encoded next where field 1405 is the MAU or ALU Rt operand Offset 2-bit field, field 1406 is the MAU or ALU Rx operand Offset 2-bit field, field 1407 is the MAU or ALU Ry operand Offset 2-bit field, field 1408 is the ALU or DSU Rt operand Offset 2-bit field, field 1409 is the ALU or DSU Rx operand Offset 2-bit field, and field 1410 is the ALU or DSU Ry operand Offset 2-bit field. The load or store unit uses a 2-bit Offset field 1411 for the Rt offset operand of the selected VIM load or store instruction. The CXV1 uses a 6-bit VIM Offset field 1412 with V0 specified by the architecture as the VIM base address register.

A number of other offset compound XV instructions may be useful for many applications. A Compound Single Arithmetic Offset XV 1420 shown in FIG. 14B uses CS5 1423 to select the MAU, the ALU or the DSU (MIA/D) and provides RtOfs 1424, RxOfs 1425 and RyOfs 1426 to be added to the CS5 selected VIM accessed MIA/D instruction to create a new set of operand addresses. Note that due to the larger offset fields 1424-1426 a greater range of supporting offset values can be specified. Also note that due to available space in the encoding format the VIM offset field VOFS 1428 is expanded to 7-bits and a Vb bit 1430 is used to select between V0 and V1 as the VIM address base register.

The Compound Double Arithmetic Offset XV 1440 illustrated in FIG. 14C may be used to select two arithmetic instructions from the accessed VIM VLIW and dynamically generate the offset addresses for each of the selected instructions operands. Two-bit offset fields 1442-1452, are used in the offset addition.

The Compound Load/Store plus Arithmetic Offset XV illustrated in 1460 FIG. 14D may be suitably used to select two instructions where one of the instructions selected is a load or store instruction and the other instruction is an arithmetic instruction. 3-bit offset fields 1462-1468 are used in the offset addition.

The Compound Load and Store Offset XV illustrated in 1480 FIG. 14E may be suitably used to select two instructions where one instruction is a load instruction and the other instruction is a store instruction. Due to the available formatting space, the load Rt offset 1482 and the store Rt offset 1484 use 6-bit fields allowing a very wide range of offset values.

Using a CXV1 as the instruction received in IR1 1202 in FIG. 12, the 6-bit VOFS 1204 is added 1206 to the selected V0 VIM base address register value 1208 generating a VIM address 1210. The VLIW at the generated VIM address is accessed from VIM 1211 and latched in the iVLIW register 1212. In the next cycle, the selected bit fields of the iVLIW register are passed on to the execution unit decode and format logic 1213, a decode of the data types and opcodes generates data scaling signals 1214-1218, and other selected bit fields, such as the operand bit fields, are then added to the associated CXV1 selected execution unit Offset values.

In more detail, for CS4 1306 set to 000 specifying [Load, MAU, ALU] selection and 32-bit data types, the Load slot instruction Rt operand bit field 1224, from the load slot output 1225, is added by adder 1226 to the L/S Ofs bit field 1228 sourced from the CXV1 instruction in IR2 1230. Similarly, the MAU slot instruction Rt operand bit field, Rx operand bit field and Ry operand bit field collectively labeled as 1232, from the MAU slot output 1233, are each individually added by adder 1234 to the MIA RtOfs, M/A RxOfs and M/A RyOfs bit fields collectively labeled as input signal 1236 to produce three new operand addresses Rt', Rx', and Ry' 1238. A similar addition occurs for the VIM ALU slot instruction's Rt, Rx and Ry bit fields being added to their associated A/D RtOfs, A/D RxOfs and A/D RyOfs in three operand adders represented by adder unit 1240. The other bit fields of the VLIW selected Load, MAU, and ALU instructions are passed onto their associated load decode and format logic 1242, MAU decode and format logic 1244 and ALU decode and format logic 1246 where opcode fields and data type fields are decoded, for example. Decode information such as data types are passed back on signal lines 1214-1218 to the operand adders so that proper scaling of the additions can occur. For example, with 2-bit offset fields, the Table 5 offset additions shown below could be obtained.

TABLE 5

| 2-bit RtOfs, RxOfs and RyOfs | Offset addition to VIM supplied base operand address |
|---|---|
| 00 | No offset use VIM specified operands directly |
| 01 | Offset by 1 for 32-bit data types, by 2 for 64-bit data types and by 4 for 128 bit data types |
| 10 | Offset by 2 for 32-bit data types, by 4 for 64-bit data types and by 8 for 128 bit data types |
| 11 | Offset by 3 for 32-bit data types, by 6 for 64-bit data types and by 12 for 128 bit data types |

With larger compound XV offset bit fields, other offset values can be obtained.

While the Offset compound XVs provide capability to select three instructions from a VLIW and dynamically transform various bit fields such as the operand fields, there is limited space available in the Offset compound XV instruction format to specify a wide range of offset values. By adapting a specialized vector processing technique termed register file indexing (RFI) described in greater detail in U.S. Pat. No. 6,446,190 for use with compound XVs, a capability to dynamically process a block of data is obtained providing additional advantages and resolving the limited space available in the compound XV instruction format for specifying operand transform values. This patent and all other patents referred to throughout this application are hereby incorporated by reference herein in their entirety.

Register file indexing is a technique used for updating operand addresses within a VLIW so that each successive invocation of that VLIW using an RFI control instruction causes one or more instructions to operate on new operands. Compound XVs can also modify operand addresses, as previously described above, by transforming the static instruction information stored in an indirectly referenced VLIW based on dynamically supplied information contained in the compound XV. The RFI technique can be used to extend the compound XV architecture by using state information in the form of stored operand addresses in addition to information provided by the executing compound XV instruction and the stored VLIW instructions. In U.S. Pat. No. 6,446,190, the stored RFI state information was located in one or more sets of register. By adapting the RFI technique for use with compound XVs as taught herein, a new vector-like architecture is created that provides improved capabilities. The improvements include the use of memory directly associated with the VIM for retaining RFI state instead of sets of registers, new means to specify RFI control parameters built into new forms of compound XVs (RFIXVs) thereby reducing or in some cases eliminating the need to explicitly load RFI control information and mechanisms for varying the operands targeted for indexing within the referenced VLIWs using the new RFIXVs which further improves flexibility. These improvements are particularly useful for reducing the number of VLIWs required in any particular application, which in turn reduces the number of cycles and the number of short instruction words in program memory required to load the VLIWs. The RFIXVs improve program code density, application performance and minimizes overall power utilization in support of VIM loading and accessing.

Figure 15:
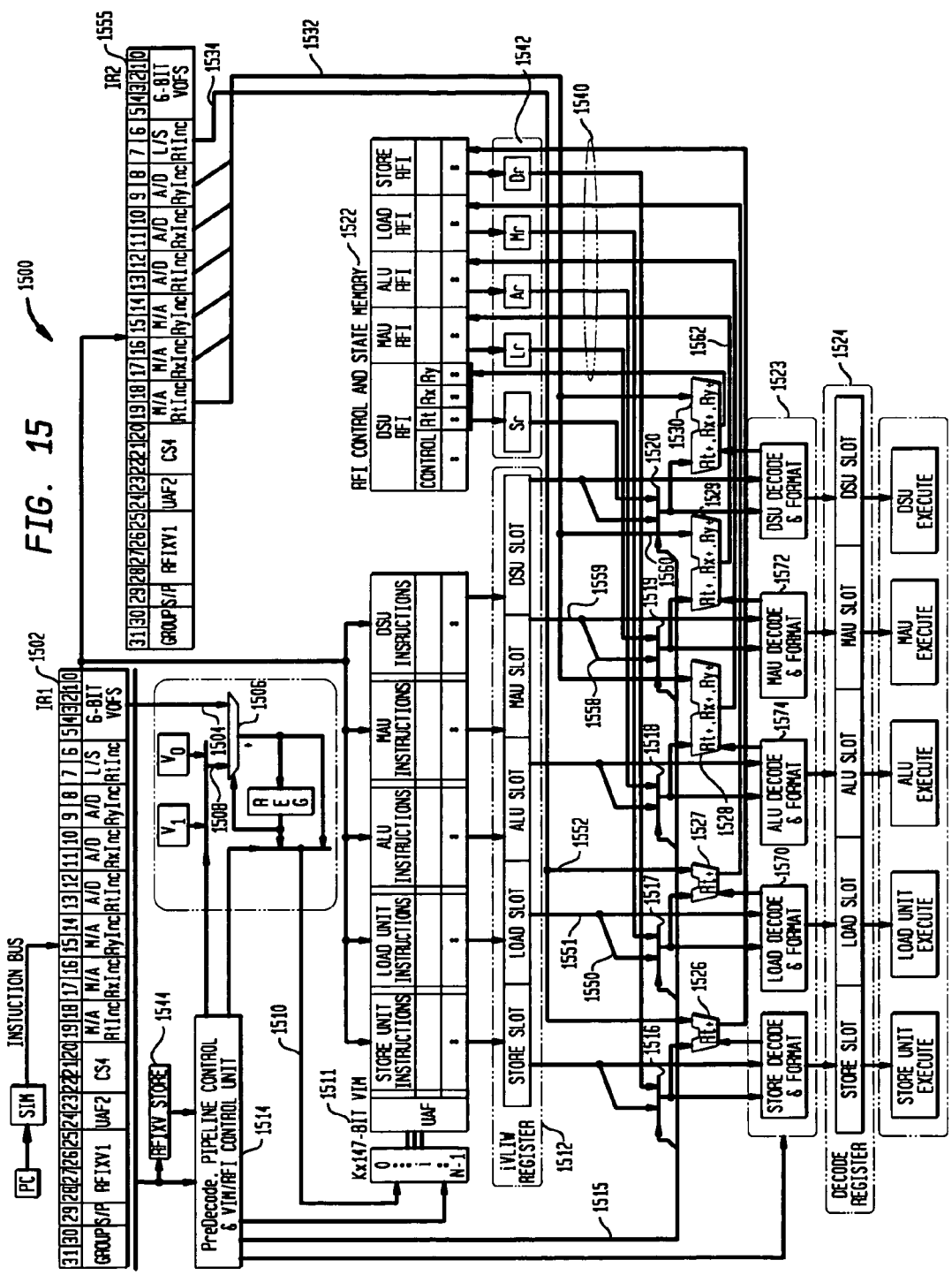
FIG. 15 illustrates a high-level view of an example of an indirect VLIW instruction path that supports the RFI compound XV class of instructions.

FIG. 15 illustrates an example of an RFI compound XV instruction path 1500. This illustration is similar to FIG. 12 system 1200 with the exception that the operand addresses are transformed through an RFI incrementing technique using operand increment (RaInc) values provided in the XV with base operand addresses provided by the VIM VLIW instructions instead of an offset addition mechanism. The FIG. 15 instruction path hardware functions to select a VLIW from VIM in the same manner as described with the apparatus of FIG. 3 and FIG. 12. It is during the decode cycle that one, two or three selected slots transform their specified fields using the RFI techniques. The architectural details of four examples of RFIXVs are described next in order to facilitate a more detailed description of FIG. 15.

FIG. 16A illustrates an encoding format for a Compound Load/Store plus Double Arithmetic RFI XV (RFIXV1) 1600 which is similar in form to CXV1 1400 of FIG. 14A with the difference that operand increment values 1602-1614 are provided instead of offset values 1405-1411. Also, a unique opcode 1615 is used identifying it as a RFI compound XV. UAF2 1617, CS4 1616 and 6-bit VOFS 1618 are specified in the same manner as the CXV1's UAF2 1403, CS4 1404 and 6-bit VOFS 1412. This format 1600 is used in describing the basic RFI operation using the RFI compound XV instruction path 1500.

FIG. 16B illustrates an encoding format for a Compound Double Arithmetic RFI XV 1620 which is similar to the Compound Double Arithmetic Offset XV 1440 of FIG. 14C. The RFIXV2 1621 and CS5 1622 fields uniquely specify this instruction as an RFI instruction, and the bit fields 1624-1634 are treated as RFI increment fields.

FIG. 16C illustrates an encoding format for a Compound Load/Store plus Arithmetic RFI XV 1640 which is similar in form Compound Load/Store plus Arithmetic Offset XV 1460 of FIG. 14D. The RFIXV3 1641 and CS6 1642 fields uniquely specify this instruction as an RFI instruction and the bit fields 1644-1650 are treated as RFI increment fields.

FIG. 16D illustrates an encoding format for a Compound Load and Store RFI XV 1660 which is similar in form to Compound Load and Store Offset XV 1480 of FIG. 14E. The RFIXV3 1661 and CS6=111 1662 fields uniquely specify this instruction as an RFI instruction and the bit fields 1670 and 1672 are treated as RFI increment fields.

Using the RFIXV1 1600 of FIG. 16A as the instruction received in IR1 1502 in FIG. 15, the 6-bit VOFS 1504 is added to adder 1506 to the selected V0 VIM base address register value 1508 generating a VIM address 1510. The VLIW at the generated VIM address is accessed from VIM 1511 and latched in the iVLIW register 1512. Though a number of options exist, the RFI control logic located in PreDecode, Pipeline Control and VIM/RFI Control Unit 1514 is initialized and enabled when a control bit such as a Start RFI bit is enabled by the program. The start bit or a similar enabling mechanism is used for controlling the operand path and update mechanism on the first execution of an RFI instruction, such as the RFIXV1. For the first execution of the RFIXV1, the selected instructions' operand addresses, specified in the accessed VLIWs from VIM and latched in iVLIW register 1512, are used as the starting addresses for RFI block operations. To this end, the RFI control logic supplies multiplexer selection signals 1515 to each multiplexer 1516-1520 to select the iVLIW operand addresses from 1512 on the first RFIXV1 execution. Note that multiplexers 1516-1520 are shown in FIG. 15 with a single multiplexer symbol for simplicity of illustration, but these single symbols represent multiple multiplexers, at least one for each operand address that is to be transformed. For example, on the arithmetic slots, there are up to three operand addresses that may be transformed on an RFI operation and each operand would have at least one multiplexer to select its associated operand path from the iVLIW register arithmetic operand address fields.

After the start of the first RFIXV1 operation, the start bit or other such enabling mechanism is reset. Note that the start bit or some other enabling state may be stored in the RFI control logic 1514, or in the RFI Control and State Memory 1522. The RFI Control and State Memory 1522 stores update control information for RFI operations, as required by a particular application and RFI state information for saving updated operand addresses for RFIXV selected instructions.

While the first RFIXV1 instruction's VLIW, which selects the data blocks starting addresses, is passed through, without transforming the operand addresses, to the execution units; the multiplexers' outputs 1516-1520 are selectively added by adders 1526-1530 with their appropriate RFIXV1 operand Inc fields 1532 for CS4 selected arithmetic operands and for CS4 selected load or store operands 1534. The Inc values are scaled by the decoded VLIW instructions' data type prior to adding such that for 32-bit data types and an encoded increment (RaInc) of 1 the operand address is updated by 1. If the data type specifies a 64-bit operand, then the encoding update of 1 is scaled to point to the next 64-bit operand. For example, with 2-bit increment fields, the following 6 increment additions shown in Table 6 could be obtained.

TABLE 6

| 2-bit RtInc, RxInc and RyInc | RFI addition to operand address |
|---|---|
| 00 | No increment use VIM specified operand directly |
| 01 | Increment by 1 for 32-bit data types, by 2 for 64-bit data types and by 4 for 128 bit data types |
| 10 | Increment by 2 for 32-bit data types, by 4 for 64-bit data types and by 8 for 128 bit data types |
| 11 | Increment by 3 for 32-bit data types, by 6 for 64-bit data types and by 12 for 128 bit data types |

With larger compound XV Inc bit fields, other increment values can be obtained. These selected and incremented operand addresses 1540 are stored in the RFI Control and State Memory 1522 for use in subsequent RFIXV1 operations.

Note that in the exemplary instruction path 1500 when an RFI compound XV instruction is received in IR1 1502, both the VIM 1511 and RFI Control and State Memory 1522 are accessed using the same VIM address 1510. Accessed values from the RFI Control and State Memory are stored in an iRFI register 1542. This access may vary depending upon whether RFI Control and State Memory is of the same number of locations as the VIM memory or if RFI Control and State Memory is only provided for a select VIM address range. This choice is dependent upon the needs of a specific application. For example, the RFI Control and State Memory 1522 could be incorporated into an expanded VIM. For the purposes of this description, the RFI Control and State Memory is assumed to have the same address range as the VIM.

Upon the receipt of the next set of RFIXV1 instructions, each of exactly the same format as the previous RFIXV1 instruction as tested for by a comparison of the stored RFIXV1 instruction 1544 with the instruction in IR1 1502, a different multiplexer path for the operand addresses is chosen. Specifically, if the next RFIXV1 instruction compares equal to the stored RFLXV1 instruction, then the RFI control logic supplying multiplexer selection signals 1515 to each multiplexer 1516-1520 selects the stored RFI updated address state from the iRFI register 1542. The new updated operand addresses are latched in the decode registers 1524 for use in the execution cycles of the selected instructions. While the updated operand addresses are selected and latched in the decode registers, a next set of updated operand addresses are being generated in the adders 1526-1530 for storage in the RFI Control and State Memory 1522 in preparation for the next RFIXV1. Depending upon whether a data block size was specified or implied by the RFI compound XV instruction, the operand addresses will either continue to increment for each received RFIXV1 or wraparound to the beginning of the data block address. Data block size can be specified by control bits stored in the RFI Control and State Memory 1522.

In more detail, for CS4 1306 set to 000 specifying [Load, MAU, ALU] selection, Load slot instruction Rt operand bit field 1550, from load slot output 1551, is selected by multiplexer 1517 and added by unit 1527 to the L/S RtInc bit field 1552 sourced from the RFIXV1 instruction in IR2 1555. Similarly, the MAU slot instruction Rt operand bit field, Rx operand bit field and Ry operand bit field collectively labeled as line 1558, from MAU slot output 1559, are selected by multiplexers 1519 and each individually added by adder 1529 to the M/A RtInc, M/A RxInc and M/A RyInc bit fields collectively labeled as line 1560 to produce three new operand addresses Rt', Rx' and Ry' 1562. A similar addition occurs for the VIM ALU slot instruction's Rt, Rx and Ry bit fields being added to their associated A/D RtInc, A/D RxInc and A/D RyInc in three operand adders represented by unit 1528. The other bit fields of the VLIW selected Load, MAU, and ALU instructions are passed onto their associated Load Decode and Format logic 1570, MAU Decode, and Format logic 1572 and ALU Decode and Format logic 1574 where, for example, opcode fields and data type fields are decoded. Decode information such as data types are passed back to the operand adders so that proper scaling of the additions can occur. After the first RFIXV1, in other words, on subsequent RFIXV1's, the incremented operand addresses are stored in the RFI Control and State Memory 1522.

By storing the updated operand addresses in the RFI Control and State Memory, it is possible to allow non-RFI instructions to be intermixed between compound RFI operations without affecting the RFI operand address sequence. When a non-RFI instruction is detected, the RFI compound XV logic preserves the required compound XV RFI state while the non-RFI instructions are executing.

It is noted that a ManArray processor such as the one shown in FIG. 1, finishes the execution phase of its pipeline with a write back to the register file. This approach allows the next cycle after the write-back cycle to use the results in the next operation. By judicious programming, chaining of vector operations, as controlled by RFI compound XV instructions, is then inherent in the architecture. No separate bypass paths need be provided in the execution units to support vector chaining.

It is noted that operand addresses may be used to select operands from register files or from memory units depending upon the architecture specification. As architecture specified register files and memory units become larger in capacity, such as 128 entry register files, larger data block sizes can be processed efficiently with the RFI compound XVs without changing the RFI compound XV instruction formats since the RFI compound XVs specify, for example, instruction selection and operand increment values and do not limit operand address ranges.

While the present invention has been disclosed in the context of various aspects of presently preferred embodiments, it will be recognized that the invention may be suitably applied to other environments consistent with the claims which follow.

We claim:

1. An apparatus for executing a transformed very long instruction word (VLIW), the apparatus comprising:
   a short instruction word (SIW) register holding an SIW having at least one dynamic slot instruction operand and an indication of at least one SIW slot instruction to transform;
   a VLIW register for holding a plurality of SIW slot instructions retrieved from a VLIW memory, each SIW slot instruction having at least one stored slot instruction operand;
   a controller selecting, based on the indication, the at least one SIW slot instruction from the VLIW register and selecting between the at least one dynamic slot instruction operand and the at least one stored slot instruction operand of the selected at least one SIW slot instruction from the VLIW register to combine with the selected at least one SIW slot instruction from the VLIW register to form a transformed SIW slot instruction of the same format as the at least one SIW slot instruction; and
   at least one execution unit receiving the transformed slot SIW instruction from the controller, the at least one execution unit executing the transformed SIW slot instruction.

2. The apparatus of claim 1 wherein the short instruction word is a compound execute VLIW (XV) instruction comprising an indication of at least two of the plurality of slot instructions received.

3. The apparatus of claim 2
   wherein the compound XV instruction is a compound load plus arithmetic XV (LAXV) instruction, the LAXV instruction commanding both a stored load instruction and a stored arithmetic instruction to be executed using at least one dynamic slot instruction operand;
   wherein the at least one dynamic slot instruction operand comprises a load operand and an arithmetic operand;
   wherein the at least one stored slot instruction operand comprises a stored load operand and a stored arithmetic operand; and
   wherein the at least one execution unit comprises a load execution unit and an arithmetic execution unit.

4. The apparatus of claim 3
   wherein the stored arithmetic instruction is an arithmetic logic unit (ALU) instruction, a multiply accumulate unit (MAU) instruction, or a data select unit (DSU) instruction; and
   wherein the LAXV instruction includes control bits specifying which previously stored arithmetic instruction is to be executed with the load instruction.

5. The apparatus of claim 3 wherein the arithmetic operand is an immediate arithmetic operand or a register operand.

6. The apparatus of claim 1 wherein the controller further comprises a plurality of selectors, the plurality of selectors multiplexing input between the VLIW register and the SIW register.

7. The apparatus of claim 1 disposed in an indirect VLIW processor.

8. The apparatus of claim 1 wherein the SIW further comprises an offset which is combined with a base address register to indirectly access the plurality of slot instructions from the VLIW instruction memory (VIM).

9. An apparatus for executing a transformed very long instruction word (VLIW), the apparatus comprising:
   a short instruction word (SIW) register holding an SIW having at least one dynamic slot instruction operand and an indication of at least one SIW slot instruction to transform;
   a VLIW register for holding a plurality of SIW slot instructions retrieved from a VLIW memory, each SIW slot instruction having at least one stored slot instruction operand;
   a controller transforming at least one of a plurality of slot instructions selected, based on the indication, from the VLIW register according to a transformation operation to the same format as the selected SIW slot instruction utilizing the at least one dynamic slot instruction operand and the at least one stored slot instruction operand of the selected at least one slot instruction from the VLIW register as input to the transformation operation; and
   at least one execution unit receiving the transformed slot instruction from the controller, the at least one execution unit executing the transformed slot instruction, wherein the transformed slot instruction is an SIW.

10. The apparatus of claim 9 wherein the transformation operation comprises scaling the at least one stored slot instruction operand by shifting the at least one stored slot instruction operand by the number of bits specified in the at least one dynamic slot instruction operand.

11. The apparatus of claim 9 wherein the results of the transformation operation are stored as state information.

12. An apparatus for executing a transformed very long instruction word (VLIW), the apparatus comprising:
   a short instruction word (SIW) register holding an SIW having an offset of at least one dynamic slot instruction operand and an indication of at least one SIW slot instruction to transform;
   a VLIW register for holding a plurality of SIW slot instructions retrieved from a VLIW memory, each SIW slot instruction having a base address of at least one stored slot instruction operand;
   a controller combining the offset of at least one dynamic slot instruction operand with the base address of at least one stored slot instruction operand from a selected, based on the indication, at least one slot instruction from the VLIW register to form an address of at least one stored slot instruction operand, the address combining with the selected at least one slot instruction from the VLIW register to form a transformed SIW slot instruction of the same format as the at least one slot instruction; and
   at least one execution unit receiving the transformed SIW slot instruction from the controller, the at least one execution unit executing the transformed SIW slot instruction.

13. An apparatus for executing a transformed very long instruction word (VLIW), the apparatus comprising:
- a short instruction word (SIW) register holding an SIW having at least one dynamic slot instruction operand increment value and an indication of an SIW slot instruction to transform;
- a register file indexing (RFI) memory for storing an address of a next operand to be used as a stored next operand address when executing the slot instruction indicated in the SIW;
- a VLIW register for holding a plurality of SIW slot instructions retrieved from a VLIW memory, each SIW slot instruction having a base address of at least one stored slot instruction operand;
- an adder adding the stored next operand address of the slot instruction indicated in the SIW and at least one dynamic slot instruction operand increment value of the slot instruction indicated in the SIW to form a second address operand;
- a controller combining the stored next operand address with the slot instruction indicated in the SIW to form a transformed SIW slot instruction of the same format as the slot instruction indicated in the SIW in which the second address operand replaces the stored next operand address; and
- at least one execution unit receiving the transformed SIW slot instruction from the controller, the at least one execution unit executing the transformed SIW slot instruction.

14. The apparatus of claim 13 wherein the second address operand is stored in the RFI memory as the address of the next operand to be used.

15. The apparatus of claim 14 wherein the controller in a first cycle selects the operand accessed by the base address of at least one stored slot instruction operand of the slot instruction indicated in the SIW.

16. A method for executing a transformed very long instruction word (VLIW), the method comprising:
- receiving a first short instruction word (SIW) having at least one dynamic slot instruction operand and an indication of at least one slot instruction to transform, wherein a slot instruction is a SIW;
- retrieving a plurality of slot instructions from a VLIW memory to a VLIW register, each slot instruction having at least one stored slot instruction operand;
- selecting, based on the indication, at least one slot instruction from the VLIW register;
- selecting between the at least one dynamic slot instruction operand and the at least one stored slot instruction operand of the selected at least one slot instruction from the VLIW register to combine with the selected at least one slot instruction from the VLIW register to form at least one transformed slot instruction of the same format as the selected at least one slot instruction, wherein the transformed slot instruction is an SIW; and
- executing the at least one transformed slot instruction.

17. The method of claim 16 wherein the first short instruction word is a compound execute VLIW (XV) instruction.

18. The method of claim 17
wherein the compound XV instruction is a compound load plus arithmetic XV (LAXV) instruction, the LAXV instruction commanding both a previously stored load instruction and a previously stored arithmetic instruction be executed using at least two dynamic slot instruction operands;
wherein the at least two dynamic slot instruction operands comprising a load operand and an arithmetic operand;
wherein the at least two stored slot instruction operands comprising a stored load operand and a stored arithmetic operand; and
wherein the at least two transformed slot instructions comprise a transformed load slot instruction and a transformed arithmetic slot instruction.

19. The method of claim 18
wherein the previously stored arithmetic instruction is an arithmetic logic unit (ALU) instruction, a multiply accumulate unit (MAU) instruction, or a data select unit (DSU) instruction; and
wherein the LAXV instruction includes control bits specifying which previously stored arithmetic instruction is to be executed with the load instruction.

20. The method of claim 18 wherein the arithmetic operand is an immediate arithmetic operand or a register operand.

21. The method of claim 16 wherein the selecting step further comprises multiplexing input between the plurality of slot instructions and the SIW.

22. The method of claim 16 wherein the retrieving step further comprises
extracting an offset from the SIW; and
combining the offset with a base address register to indirectly access the plurality of slot instructions from the VLIW instruction memory (VIM).

23. An apparatus for executing a transformed very long instruction word (VLIW), the apparatus comprising:
- a short instruction word (SIW) register holding an SIW having at least two dynamic slot instruction operands, an indication of at least two SIW slot instructions to transform, and an offset address;
- a VLIW memory (VIM) base address register storing a base address;
- a VLIW register for holding a plurality of slot instructions retrieved from a VLIW memory by combining the offset address with the base address, each slot instruction having at least one stored SIW slot instruction operand, at least two of the plurality of slot instructions retrieved corresponding to the indication of at least two slot instructions;
- a plurality of multiplexers receiving the at least two dynamic slot instruction operands and at least two SIW stored slot instruction operands corresponding to the indication of the at least two SIW slot instructions;
- a controller controlling the plurality of multiplexers to select between the at least two dynamic slot instruction operands and the corresponding at least two stored SIW slot instruction operands, the selected at least two operands combining with the at least two SIW slot instructions from the VLIW register to form at least two transformed SIW slot instructions of the same format as the at least two SIW slot instructions; and
- at least two execution units receiving the at least two transformed slot instructions, the at least two execution units executing the transformed slot instructions in parallel.

* * * * *